(12) United States Patent
Takahashi

(10) Patent No.: US 7,604,487 B2
(45) Date of Patent: Oct. 20, 2009

(54) DEVICE COMPRISING FLEXIBLE PRINTED CIRCUIT AND CONNECTION AUXILIARY MEMBER

(75) Inventor: Kei Takahashi, Kawasaki (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 82 days.

(21) Appl. No.: 12/020,044

(22) Filed: Jan. 25, 2008

(65) Prior Publication Data

US 2008/0188099 A1 Aug. 7, 2008

(30) Foreign Application Priority Data

Feb. 7, 2007 (JP) ............................. 2007-028376

(51) Int. Cl.
*H01R 12/00* (2006.01)
(52) U.S. Cl. .......................................... 439/77; 439/67
(58) Field of Classification Search ................... 439/67, 439/77, 492, 493
See application file for complete search history.

(56) References Cited

U.S. PATENT DOCUMENTS

2003/0232517 A1* 12/2003 Liu et al. ....................... 439/67
2006/0133018 A1* 6/2006 Okuda ......................... 361/681
2006/0176254 A1* 8/2006 Lee et al. ....................... 345/87
2006/0238987 A1* 10/2006 Park et al. ..................... 361/748
2006/0285353 A1* 12/2006 Kim ............................ 362/561

FOREIGN PATENT DOCUMENTS

| JP | 9-101536 A | 4/1997 |
| JP | 11-327458 A | 11/1999 |
| JP | 2001-75116 A | 3/2001 |
| JP | 2006-78790 A | 3/2006 |

* cited by examiner

*Primary Examiner*—Tho D Ta
(74) *Attorney, Agent, or Firm*—Sughrue Mion, PLLC

(57) ABSTRACT

A device includes a chassis and a flexible printed circuit. The flexible printed circuit has a terminal portion which is disposed so as to overlap with a mounted area of a circuit board mounted on a surface of the chassis. The device includes a connection auxiliary member which is disposed on the surface of the chassis at a position close to the terminal portion. The connection auxiliary member includes a fixed portion fixed to the surface of the chassis and a deformed portion connected to the fixed portion. The deformed portion deforms so that a part thereof rises from the surface of the chassis by pushing the deformed portion toward the fixed portion to lift up the terminal portion of the flexible printed circuit from the surface of the chassis.

10 Claims, 19 Drawing Sheets

30

US 7,604,487 B2

DEVICE COMPRISING FLEXIBLE PRINTED CIRCUIT AND CONNECTION AUXILIARY MEMBER

This application is based upon and claims the benefit of priority from Japanese patent application No. 2007-028376, filed on Feb. 7, 2007, the disclosure of which is incorporated herein in its entirety by reference.

BACKGROUND OF THE INVENTION

This invention relates to a device comprising structure where a flexible printed circuit board is connected to another circuit board and a connection auxiliary member for use on connecting them.

Inasmuch as liquid-crystal display devices have characteristics of thin, lightweight, and low power consumption, the liquid crystal display devices have been used in a wide area such as office automation (OA) equipments, audio visual (AV) equipments, portable terminal equipments. The liquid-crystal display device comprises a liquid crystal panel where liquid crystal is sandwiched between opposed two substrates, a backlight for illuminating the liquid crystal panel, and a cabinet for holding and fix them.

The above-mentioned backlight comprises a lot of members such as a lamp of a light source, a flexible printed circuit board connected to the lamp, a lamp holder for holding the lamp, a light guide plate for guiding a lamp beam to an irradiation surface in its entirety, a reflecting sheet for reflecting the lamp beam, and a dispersion sheet for dispersing the lamp beam through the light guide plate. The light source may be a light emitting diode (LED), a cold cathode fluorescent lamp (CCFL), or an external electrode fluorescent lamp (EEFL). In order to obtain a uniform irradiation beam, it is necessary for the backlight to correctly assemble respective members. Therefore, the backlight is normally dealt with as a backlight unit where their members are held and fixed by the cabinet such as a front chassis or a rear chassis.

Under the circumstances, the liquid-crystal display device is assembled by disposing the liquid-crystal panel in the irradiation surface side of the backlight unit, by disposing a circuit board on which a power-supply circuit for lighting the lamp up is formed in a rear surface side of the rear chassis, and by connecting the flexible printed circuit board derived from the cabinet of the backlight unit with a connector mounted on the circuit board.

Japanese Unexamined Patent Application Publication of Tokkai No. 2001-75,116 or JP-A 2001-75116 discloses a LCD device having structure where a main circuit board has an opening part formed at one part thereof and a connector on a rear side of an LCD circuit board and a connector on a rear side of the main circuit board are connected with a flexible flat cable through the opening part.

Japanese Unexamined Patent Application Publication of Tokkai No. Hei 11-327,458 or JP-A 11-327458 discloses a plane display device comprising a display panel and a circuit board for driving the display panel. The display panel has electrode terminals which are connected to the circuit board through flexible cables. The electrode terminals are connected to electrode connectors. The circuit board has board connectors while the flexible cables have printed boards. The board connectors are connected to the printed boards.

Japanese Unexamined Patent Application Publication of Tokkai No. Hei 9-101,536 or JP-A 9-101536 discloses a mounting method for display panel. A liquid crystal panel has a peripheral edge part in which connection terminals are formed. Each connection terminal is electrically connected to one end of a flexible wiring board. A common wiring board is arranged at the rear of the liquid crystal panel. The flexible wiring board is bent and another end of the flexible wiring board is electrically connected to the common wiring board by solder.

Japanese Unexamined Patent Application Publication of Tokkai No. 2006-78,790 or JP-A 2006-78790 discloses a display panel on which an IC chip is mounted. The display panel has a conductive part connected to an electrode of the IC chip. The conductive part is connected to one end of a flexible printed circuit (FPC).

Inasmuch as the flexible printed circuit has flexibility, it is feared that the flexible printed circuit derived from the chassis is in contact with another member to become damaged on transferring or handling the backlight unit.

Therefore, on assembling the backlight unit, in the manner which will later be described in conjunction with FIG. 22, terminal portions of the flexible printed circuits are disposed so as to overlap a circuit board mounted area on the rear chassis and parts except for the vicinity of the terminal portions are fixed on the rear chassis by means of hooks. However, when the circuit board is disposed on the rear chassis in this state, the terminal portions of the flexible printed circuits will be caught between the rear chassis and the circuit board.

Therefore, after the circuit board is disposed, the terminal portions of the flexible printed circuits are pulled out between the rear chassis and the circuit board. It results in occurring redundant working and malfunctions so that the flexible printed circuits receive flaws or are broken. In order to prevent such malfunctions, it is necessary to conduct difficult work so as to lift up the terminal portions of the flexible printed circuits by one hand and to dispose the circuit board by another hand. Accordingly, the workability becomes worse and it results in a malfunction so that the flexible printed circuits are broken by exerting an excess force on the flexible printed circuits.

The above-mentioned problems in connecting the flexible printed circuit are not limited to the backlight unit and occur in any device having a mounting structure where a flexible printed circuit is disposed on a surface of a chassis and a circuit board is disposed so as to overlap a terminal portion of the flexible printed circuit.

SUMMARY OF THE INVENTION

It is an exemplary object of this invention to provide a device which is capable of improving the workability on connecting a flexible printed circuit with a circuit board.

Other objects of this invention will become clear as the description proceeds.

According to a first exemplary aspect of this invention, a device comprises a chassis and a flexible printed circuit. The flexible printed circuit has a terminal portion which is disposed so as to overlap with a mounted area of a circuit board mounted on a surface of the chassis. The device comprises a connection auxiliary member which is disposed on the surface of the chassis at a position close to the terminal portion. The connection auxiliary member comprises a fixed portion fixed to the surface of the chassis and a deformed portion connected to the fixed portion. The deformed portion of the member deforms so that a part of the deformed portion rises from the surface of the chassis by pushing the deformed portion toward the fixed portion to lift up the terminal portion of the flexible printed circuit from the surface of the chassis.

According to a second exemplary aspect of this invention, a device comprises a chassis and a flexible printed circuit. The flexible printed circuit has a terminal portion which is disposed so as to overlap with a mounted area of a circuit board mounted on a surface of the chassis. The flexible printed circuit is fixed to the surface of the chassis at a fixed location except for proximity to the terminal portion. The device comprises a frame-shaped connection auxiliary member mounted to the flexible printed circuit. The connection auxiliary member has a through hole which is enable to insert the flexible printed circuit. The connection auxiliary member lifts up the terminal portion of the flexible printed circuit from the surface of the chassis so as to act the fixed location as a fulcrum and to act the connection auxiliary member as a point of action by shifting the connection auxiliary member from the terminal portion side toward the fixed location side.

According to a third exemplary aspect of this invention, a device comprises a chassis and a flexible printed circuit. The flexible printed circuit has a terminal portion which is disposed so as to overlap with a mounted area of a circuit board mounted on a surface of the chassis. The chassis comprises a connection auxiliary portion at an area in the vicinity of the terminal portion. The connection auxiliary portion is separated from the chassis. The connection auxiliary portion is coupled to the chassis by means of a hinge portion disposed to one end portion thereof. The connection auxiliary portion lifts up the terminal portion of the flexible printed circuit from the surface of the chassis by rotating about the hinge portion to lift up an opposite side thereof.

DESCRIPTION OF THE EXEMPLARY EMBODIMENTS

Figure 22:
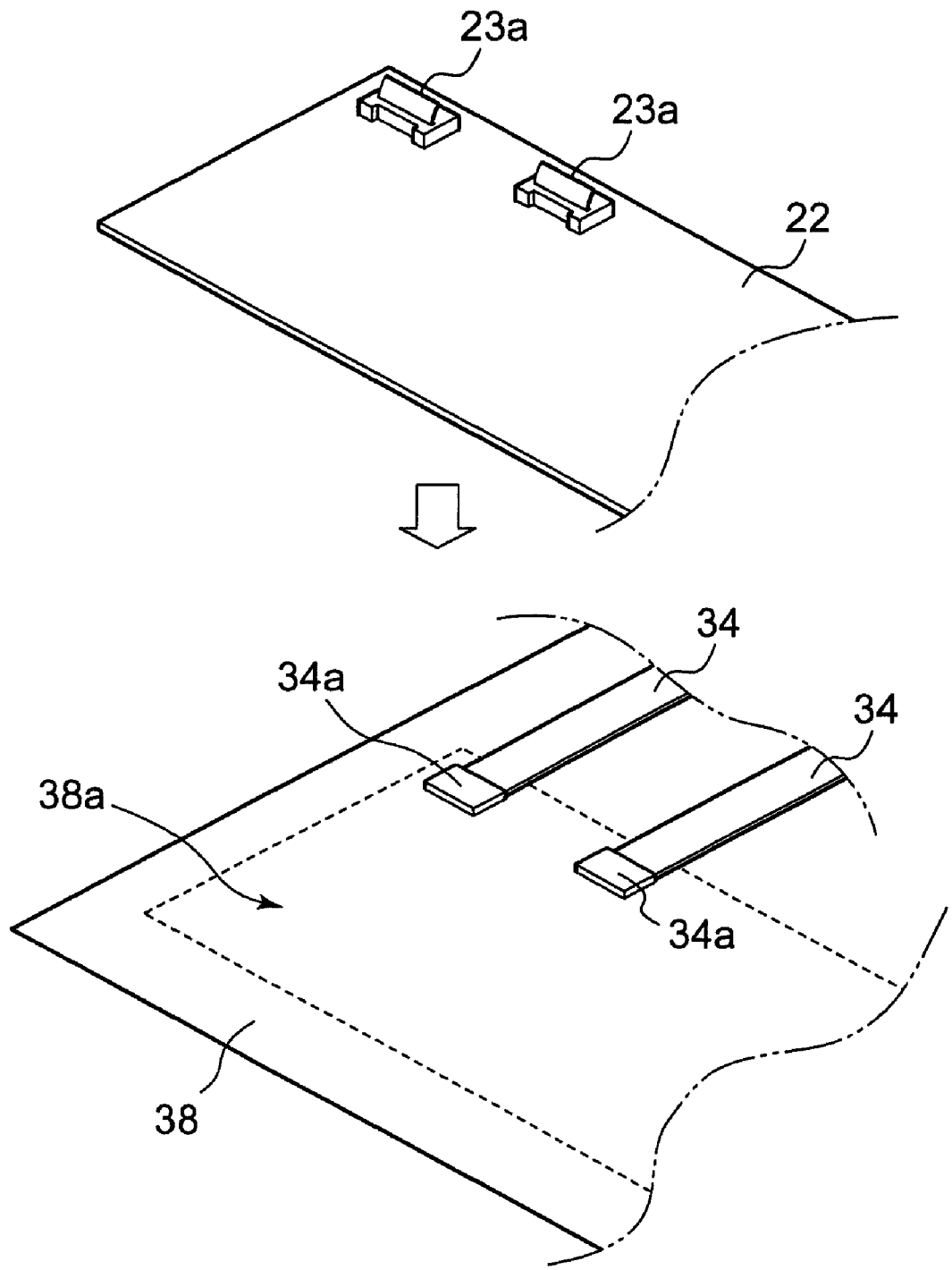
FIG. 22 is a perspective view showing a related art of a connection structure of flexible printed circuits.

Referring to FIG. 22, a related art of a connection structure of flexible printed circuits will be described at first in order to facilitate an understanding of the present invention.

As shown in FIG. 22, a backlight unit comprises a circuit board 22, a rear chassis 38, and two flexible printed circuits (FPCs) 34. The circuit board 22 has two connectors 23a. Each of the flexible printed circuit 34 has a terminal portion 34a. The rear chassis 38 has a surface including a circuit board mounted area 38a on which the circuit board 22 is mounted.

On assembling the backlight unit, the terminal portions 34a of the flexible printed circuits 34 are disposed so as to overlap with the circuit board mounted area 38a of the rear chassis 38 and parts except for the vicinity of the terminal portions 34a are fixed on the surface of the rear chassis 38 by means of hooks (not shown). When the circuit board 22 is disposed on the circuit board mounted area 38a of the rear chassis 38 in this state, the terminal portions 34a of the flexible printed circuits 34 are caught between the rear chassis 38 and the circuit board 22.

Therefore, after the circuit board 22 is disposed on the circuit board mounted area 38a of the rear chassis 38, the terminal portions 34a of the flexible printed circuits 34 are pulled out between the rear chassis 38 and the circuit board 22. It results in occurring redundant working and malfunctions so that the flexible printed circuits 34 receive flaws or are broken. In order to prevent such malfunctions, it is necessary to conduct difficult work so as to lift up the terminal portions 34a of the flexible printed circuits 34 by one hand and to dispose the circuit board 22 by another hand. Accordingly, the workability becomes worse and it results in a malfunction so that the flexible printed circuits 34 are broken by exerting an excess force on the flexible printed circuits, as mentioned in the preamble of the instant specification.

The above-mentioned problems on connecting the flexible printed circuit 34 are not limited to the backlight unit and occur in any device having a mounting structure where a flexible printed circuit 34 is disposed on a surface of a chassis 38 and a circuit board 22 is disposed so as to overlap with a terminal portion 34a of the flexible printed circuit 34.

In the manner which is described in conjunction with the background art, the backlight for illuminating the liquid crystal panel is normally provided as the backlight unit. The flexible printed circuits 34 are pulled from the chassis 38 of the backlight unit. The flexible printed circuits 34 have the terminal portions 34a which are disposed so that the terminal portions 34a are overlapped with the circuit board mounted area 38 on the chassis 38. The flexible printed circuits 34 have parts except for the terminal portions 34a that are fixed to the chassis 38. Accordingly, the related art is disadvantageous in that the terminal portions 34a of the flexible printed circuits 34 are sandwiched between the chassis 38 and the circuit board 22 when the circuit board 22 is disposed on the chassis 38 of the backlight unit.

Consequently, according to the present invention, the backlight unit is provided with a function which can lift up the terminal portions of the flexible printed circuits with a simple operation and with reliability. There are three methods. A first method is for disposing, on the chassis of the backlight unit, a connection auxiliary member having the above-mentioned function. A second method is for mounting, to the flexible printed circuit, a connection auxiliary member having the above-mentioned function. A third method is for forming, in the chassis of the backlight unit, a connection auxiliary portion having the above-mentioned function. There are three structures as structures realizing the above-mentioned function. A first structure is a structure which makes the connection auxiliary member deform by pushing it in a predetermined direction to lift up the terminal portion of the flexible printed circuit due to its deformation. A second structure is a structure which makes a distance between a fulcrum and a point of action change by shifting the connection auxiliary member toward a fixed location of the flexible printed circuit to lift up the terminal portion of the flexible printed circuit. A third structure is a structure which lifts up the terminal portion of the flexible printed circuit by lifting up the connection auxiliary portion. Now, the description will be made in a concrete manner with reference to the drawings.

Exemplary Embodiment 1

Figure 1:
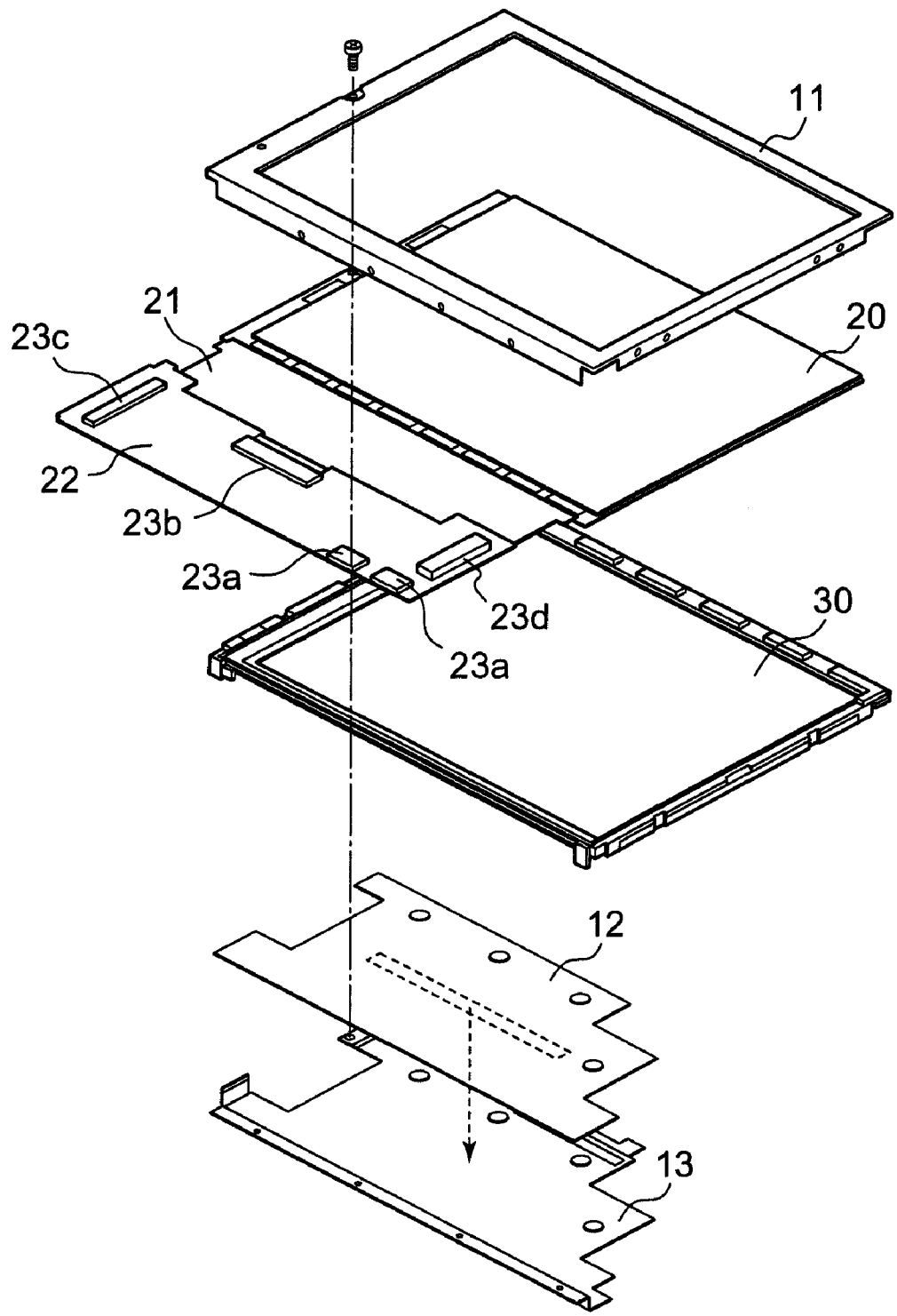
FIG. 1 is an exploded perspective view of a liquid crystal display device according to a first exemplary embodiment of this invention.
Figure 2:
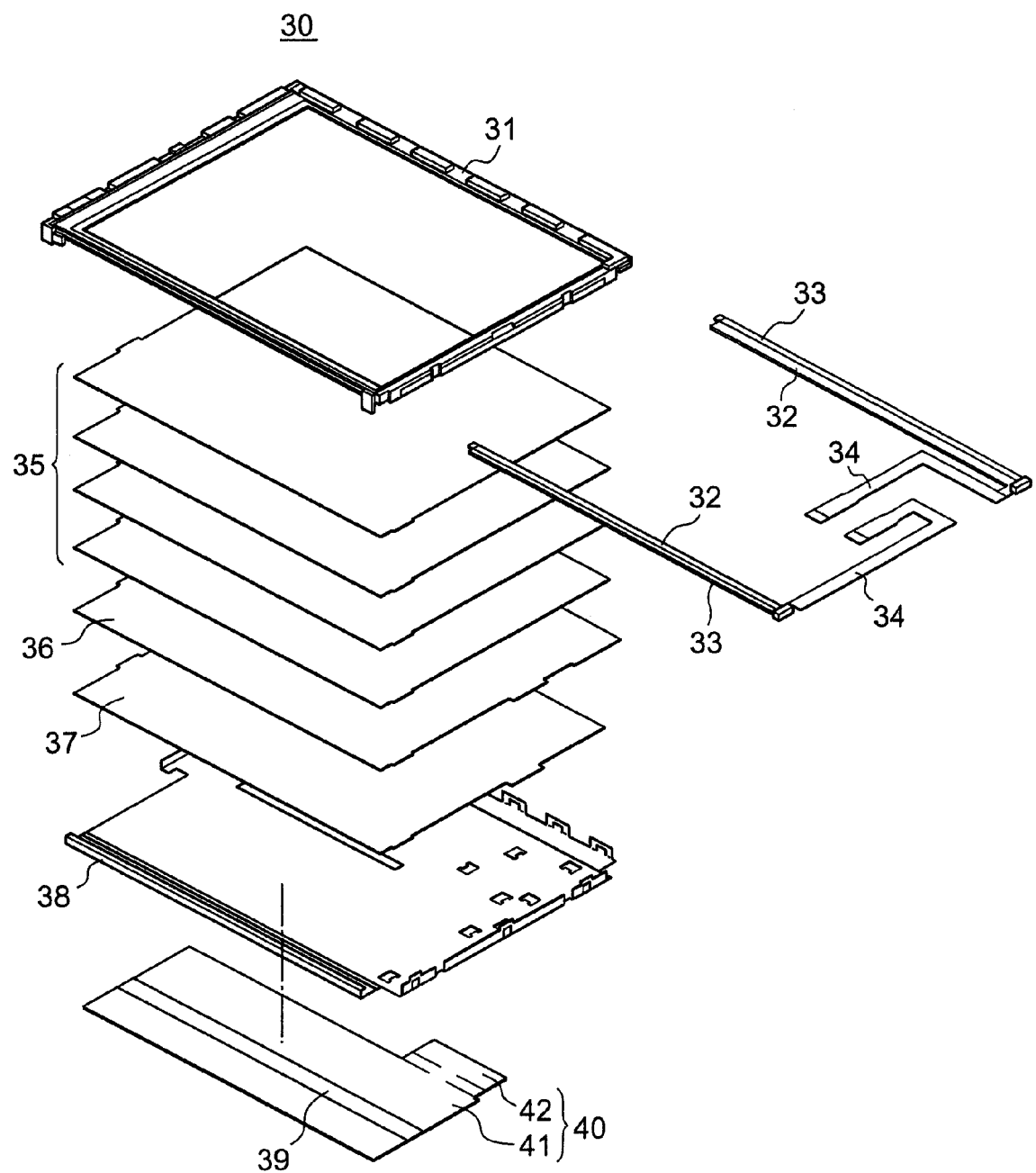
FIG. 2 is an exploded perspective view of a backlight unit for use in the liquid crystal display device illustrated in FIG. 1.
Figure 3C:
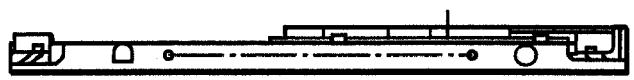
FIG. 3C is a rear view of the backlight unit illustrated in FIG. 2.
Figure 3E:
FIG. 3E is a left-hand side view of the backlight unit illustrated in FIG. 2.
Figure 3A:
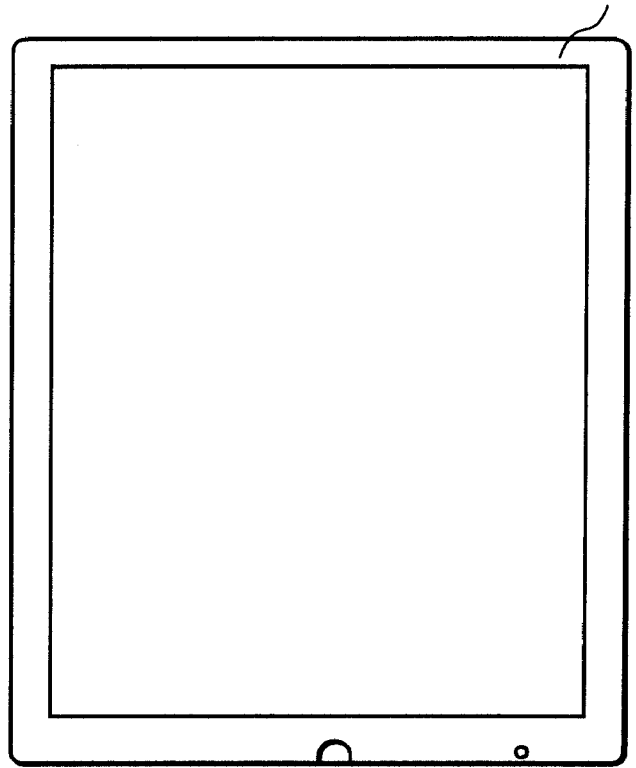
FIG. 3A is a plan view of the backlight unit illustrated in FIG. 2.
Figure 3D:
FIG. 3D is a right-hand side view of the backlight unit illustrated in FIG. 2.
Figure 3B:
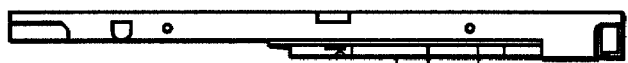
FIG. 3B is a front view of the backlight unit illustrated in FIG. 2.
Figure 4:
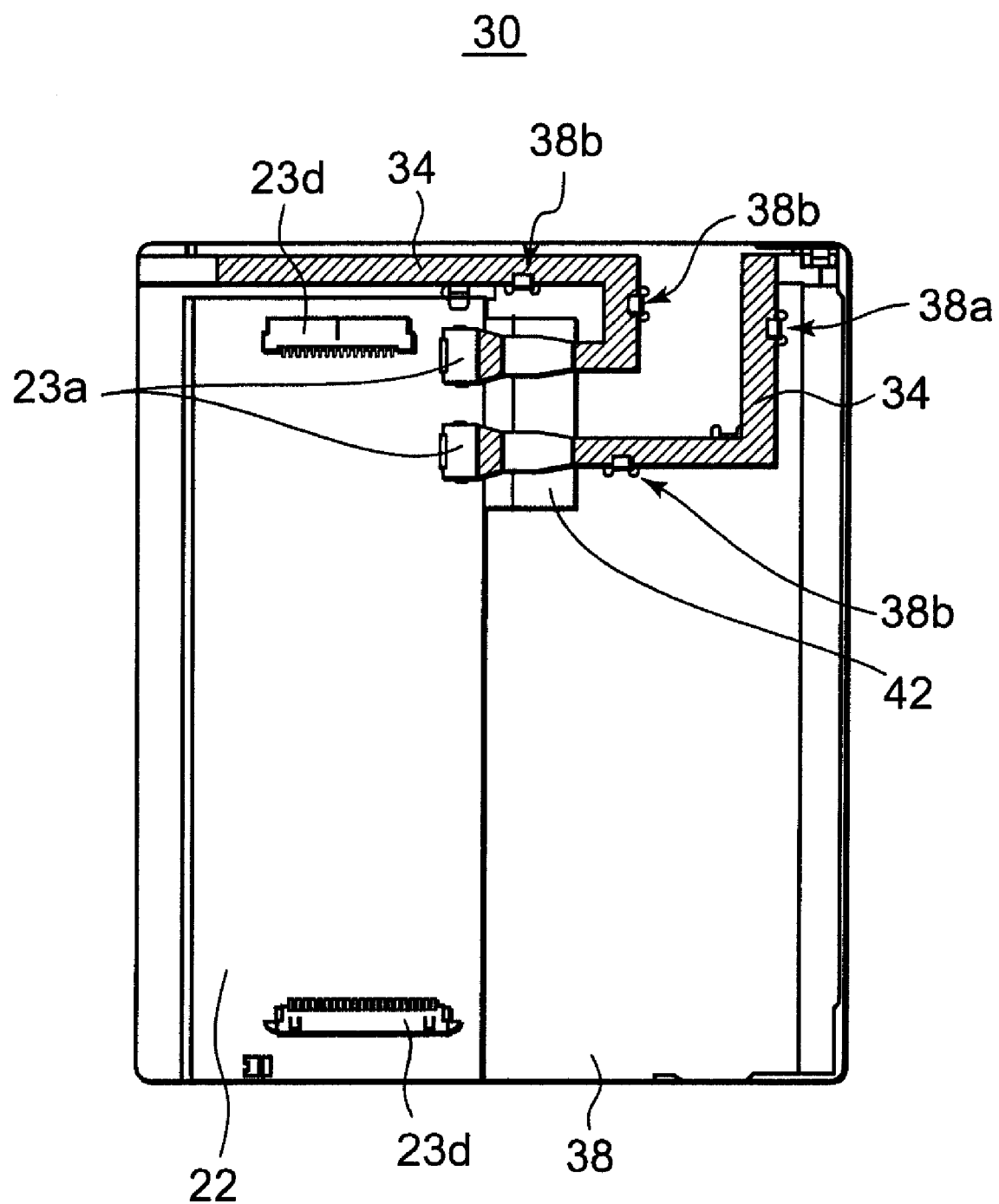
FIG. 4 is a bottom view showing a state where a circuit board is disposed on the backlight unit illustrated in FIG. 2.
Figure 5:
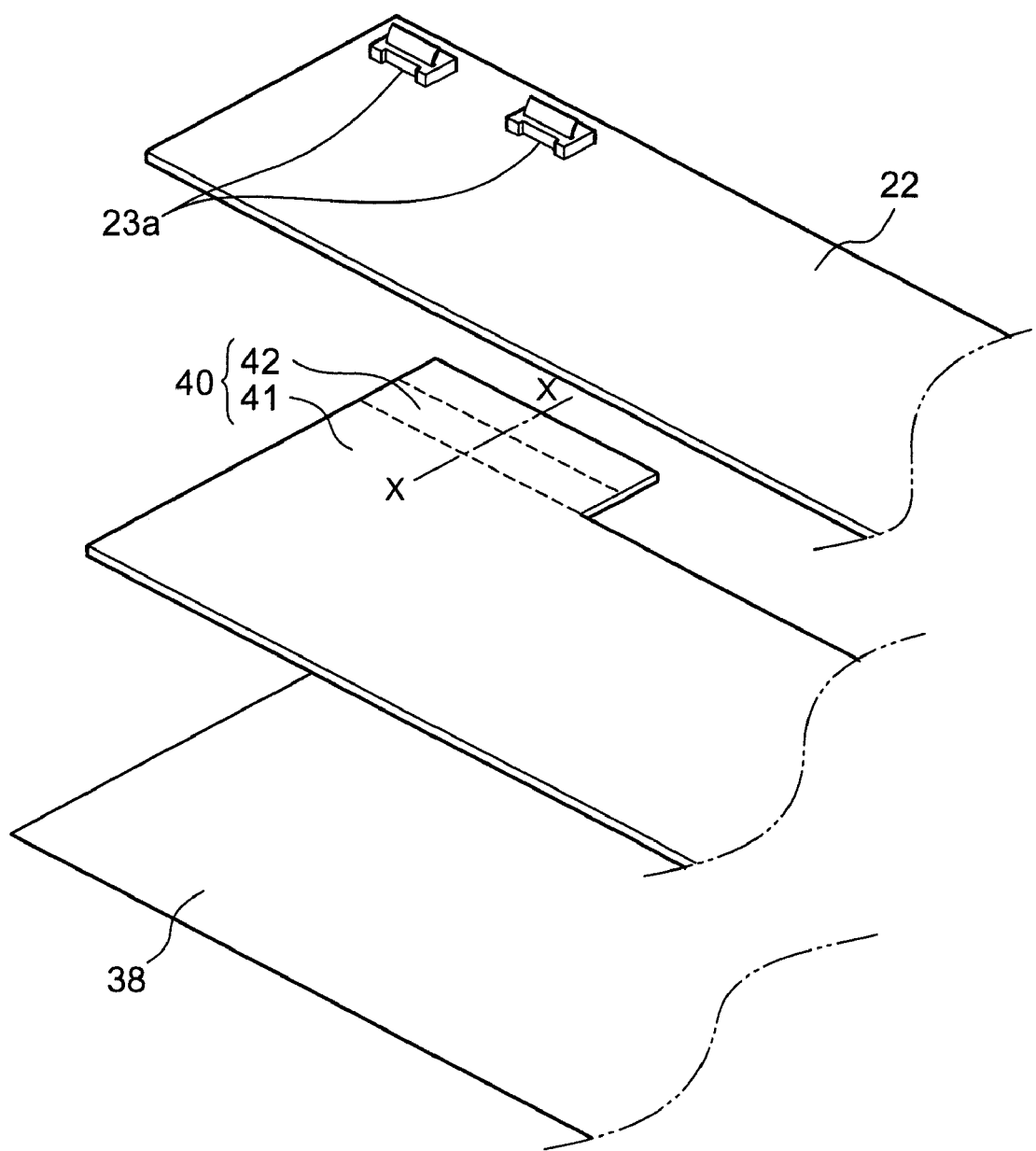
FIG. 5 is a perspective view of a connection auxiliary member according to a first exemplary embodiment of this invention together with the circuit board and a rear chassis.

Referring to FIGS. 1 to 19, the description will proceed to a backlight unit and a connection auxiliary member according to a first exemplary embodiment of this invention. FIG. 1 is an exploded perspective view of a liquid crystal display device 10 according to the first exemplary embodiment. FIG. 2 is an exploded perspective view of a backlight unit 30 for use in the liquid crystal display device 10. FIGS. 3A, 3B, 3C, 3D, and 3E are a plan view, a front view, a rear view, a right-hand side view, and a left-hand side view of the backlight unit 30 illustrated in FIG. 2. FIG. 4 is a bottom view showing a state where a circuit board 22 is disposed on the backlight unit 30. FIG. 5 is a perspective view of structure and arrangement of a connection auxiliary member 40.

As shown in FIG. 1, the liquid crystal display device 10 comprises a liquid crystal panel 20, the backlight unit 30, and first through third cabinets 11, 12, and 13 for holding and fixing them.

The liquid crystal panel 20 comprises a first substrate (not shown), a second substrate (not shown), and liquid crystal material (not shown) sealed between the first and the second substrates. The first substrate has a surface on which plural switching elements (not shown) are formed. Each switching element may comprise a thin film transistor (TFT). The first substrate has a peripheral portion (not shown) on which terminals (not shown) are mounted. The terminals are connected to a first end portion of a flexible printed circuit board 21. The flexible printed circuit board 21 has a second end portion which is connected to the circuit board 22. On the circuit board 22, a power supply circuit (not shown) for the backlight unit 30, a signal processing circuit (not shown) of the liquid crystal panel 20, and so on are formed. On the circuit board 22, first through fourth connectors 23a, 23b, 23c, and 23d are disposed. The first connectors 23a are for being connected to the backlight unit 30. The second connector 23b is for being connected to the flexible printed circuit board 21. The third and the fourth connectors 23c and 23d are for being connected to external circuits (not shown). By bending the flexible printed circuit board 21 in the backlight unit 30 side, the circuit board 22 is disposed in a rear surface of the backlight unit 30. In addition, structure of the substrates (e.g. structure of the TFT) in the liquid crystal panel 20, a driving method of the liquid crystal panel 20, shapes and arrangements of the flexible printed circuit board 21 and the circuit board 22, and structure of the first through the third cabinets 11 to 13 are not specifically restricted to those illustrated in FIG. 1.

FIG. 2 is the exploded perspective view of the backlight unit 30. The backlight unit 30 comprises first and second lamps or lights 32, first and second lamp holders 33 for holding the first and the second lamps 32, respectively, first and second flexible printed circuits (FPCs) 34 having one ends connected to the first and the second lamps 32, respectively, a light-guide plate 36, a reflecting sheet 37, a plurality of optical members 35, and first and second chassis 31 and 38 for holding them, and the connection auxiliary member 40. Each of the first and the second lamps 32 comprises a light emitting diode (LED), a cold cathode fluorescent lamp (CCFL), an external electrode fluorescent lamp (EEFL), or the like. The light-guide plate 36 is for guiding an outgoing light beam of the first and the second lamps 32 to all over the backlight unit 30. The reflecting sheet 37 reflects the outgoing light beam of the first and the second lamps 32 toward an irradiation surface. The optical members 35 comprise a diffusing sheet, a lens sheet, and so on which are for making the outgoing light beam of the first and the second lamps 32 a uniform illumination light beam. The first chassis 31 is called a front chassis because the first chassis 31 is disposed at the irradiation surface side. The second chassis 38 is called a rear chassis because the second chassis 38 is disposed at the rear surface side. The connection auxiliary member 40 comprises a fixed portion 41 and a deformed portion 42 connected to the fixed portion 41. The fixed portion 41 is fixed to the rear chassis 38 by means of a double-sided self-adhesive tape 39 or the like.

Although the backlight unit 30 has structure where the two lamps 32 are disposed on opposite sides of the backlight unit 30 in FIG. 2, only one lamp may be disposed on one side of the backlight unit 30 or four lamps may be disposed on four sides of the backlight unit 30. Although the reflecting sheet 37 is embedded in the backlight unit 30 in FIG. 2, the reflecting sheet 37 may be omitted from the backlight unit 30 when the rear chassis 38 acts as a reflecting plate. Although four optical members 35 are embedded in the backlight unit 30, the number of the optical members 35 may be any number. In addition, the optical members 35 may be disposed between the backlight unit 30 and the liquid crystal panel 20.

FIGS. 3A, 3B, 3C, 3D, and 3E are the plan view, the front view, the rear view, the right-hand side view, and the left-hand side view of the backlight unit 30 illustrated in FIG. 2. FIG. 4 is the bottom view showing a state where the circuit board 22 is disposed on the backlight unit 30. As shown in FIG. 4, connected to the lamps 32, the flexible printed circuits 34 are routed at predetermined positions on the rear chassis 38 and pass through on the deformed portion 42 of the connection auxiliary member 40. The flexible printed circuits 34 have tip portions which are connected to the first connectors 23a mounted on the circuit board 22. In addition, each flexible printed circuit 34 is fixed on the rear chassis 38 at parts except for proximity to the tip portion by FPC fixing portions 38b such as hooks or the like.

Although this exemplary embodiment exemplifies a case where the two flexible printed circuits 34 are disposed, the number of the flexible printed circuits 34 may be any number. Only one flexible printed circuit may be disposed when the only one lamp 32 is disposed at the one side portion of the backlight unit 30 and a plurality of flexible printed circuits 34 may be connected to each lamp 32. The flexible printed circuit 34 may be branched off at some midpoint or may the plurality of flexible printed circuits 34 may be integrated. In addition, inasmuch as structure illustrated in FIG. 4 is an illustration, the flexible printed circuit 34 may have any thickness, any shape, any run path, and so on. In addition, although this exemplary embodiment shows a case where the flexible printed circuits 34 are connected to the circuit board 22 connected to the liquid crystal panel 20, the flexible printed circuits 34 may be connected to another circuit board which is not connected to the liquid crystal panel 20.

Referring now to FIG. 5, the description will proceed to structure of the connection auxiliary member 40 and configuration thereof, which are distinctive parts of the exemplary embodiment.

As shown in FIG. 5, the connection auxiliary member 40 is disposed on a surface of the rear chassis 38 and the circuit board 22 is disposed on the connection auxiliary member 40. The connection auxiliary member 40 comprises the fixed portion 41 having a shape which is substantially equivalent to the circuit board 22 and the deformed portion 42 which juts from the fixed portion 41 toward the flexible printed circuits 34 side. When the deformed portion 42 is pressed or pushed toward the fixed portion 41 side, the deformed portion 42 becomes deformed so that at least one portion thereof rises from the rear chassis 38. When the deformed portion 42 is pressed or pushed from upwards, the deformed portion 42 goes back to its original position.

Figure 6A:
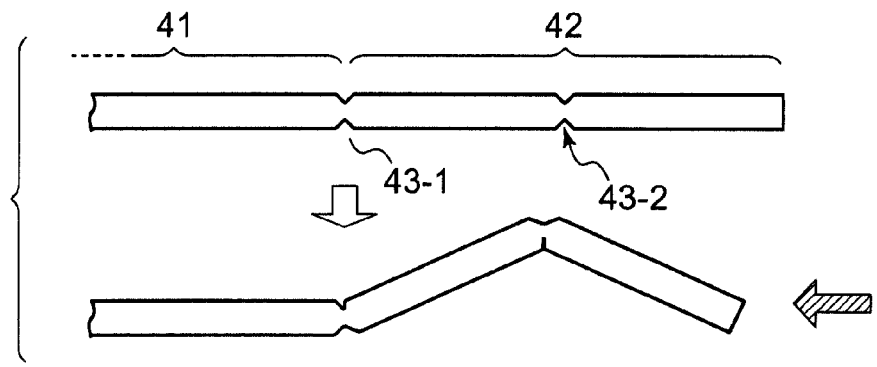
FIG. 6A is a cross sectional view taken on line X-X of FIG. 5.

FIG. 6A shows a cross sectional view taken on line X-X of FIG. 5. As shown in FIG. 6A, the connection auxiliary member 40 has flexibility and is made of a member which is capable of easily manufacturing. The connection auxiliary member 40 has first and second concave portions 43-1 and 43-2. The first concave portion 43-1 is formed at a boundary between the fixed portion 41 and the deformed portion 42 while the second concave portion 43-2 is formed at a divided position where the deformed portion 42 is substantially divided into equal parts. In other words, the second concave portion 43-2 is formed in the deformed portion 42 at an arbitrary position which is substantially orthogonal in a pushing direction. When a pushing force is applied to the deformed portion 42 from the right-hand side in FIG. 6A, the deformed portion 42 deforms at the boundary position and the divided position so that the deformed portion 42 rises at the divided position. In other words, the deformed portion 42 is bent at the first concave portion 43-1 as the starting so that the arbitrary position becomes a ridge line when the deformed portion 42 is pushed in the pushing direction.

Although material of the connection auxiliary member 40 is not particularly restricted, it is desirable that the connection auxiliary member 40 is made of an insulation material which may be a paper material, a plastic material such as polyethylene terephthalate (PET), or the like in order to insulate between the circuit board 22 and the rear chassis 38 in a case where terminals and wires on the rear surface of the circuit board 22 expose and the rear chassis 38 is made of a conductive material such as metal.

In addition, a method of forming the concave portions 43-1 and 43-2 may be an arbitrary method. For example, the concave portion 43-1 or 43-2 may be formed by making a slit by a knife or the like, may be formed by crushing by application of pressure, or may be formed by deforming by heat.

Although the concave portions 43-1 and 43-2 are formed on the deformed portion 42 at top and bottom, the first concave portion 43-1 may be formed at the boundary position between the fixed portion 41 and the deformed portion 42 on the undersurface thereof and the second concave portion 43-2 may be formed at the divided position of the deformed portion 42 on the upper surface thereof. In this event, it is possible to easily deform the deformed portion 42 in a predetermined direction.

As a matter of course, the concave portions 43-1 and 43-2 may be not formed when the connection auxiliary member 40 has sufficiently flexibility. For instance, as shown in FIG. 6B, the deformed portion 42 may be bended as a whole.

Furthermore, the fixed portion 41 and the deformed portion 42 may be a single-piece construction or may be structure where plural individual pieces are assembled. For example, it will be assumed that the connection auxiliary member 40 is made of a non-deformed material such as hard plastic, metal, or the like. In this event, as shown in FIG. 6C, the connection auxiliary member 40 may comprises three individual pieces which are coupled to each other by means of adhesive tapes 44.

Figure 6B:
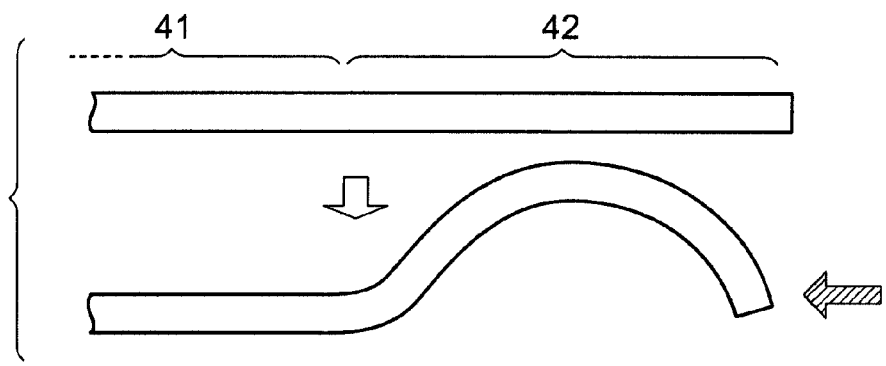
FIG. 6B is a cross sectional view showing another structure of the connection auxiliary member according to the first exemplary embodiment of this invention.
Figure 6C:
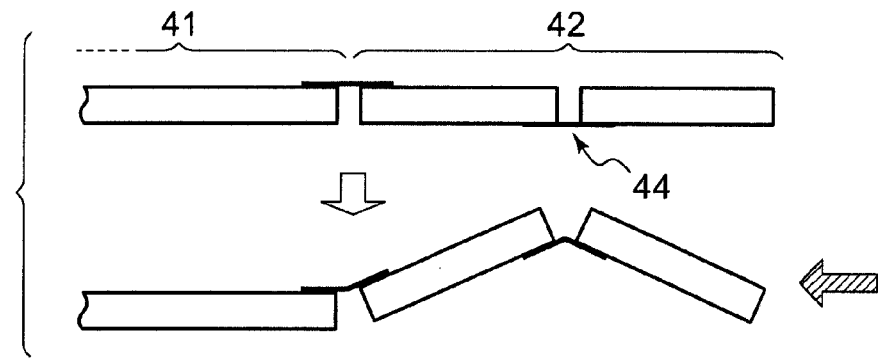
FIG. 6C is a cross sectional view showing another structure of the connection auxiliary member according to the first exemplary embodiment of this invention.
Figure 7A:
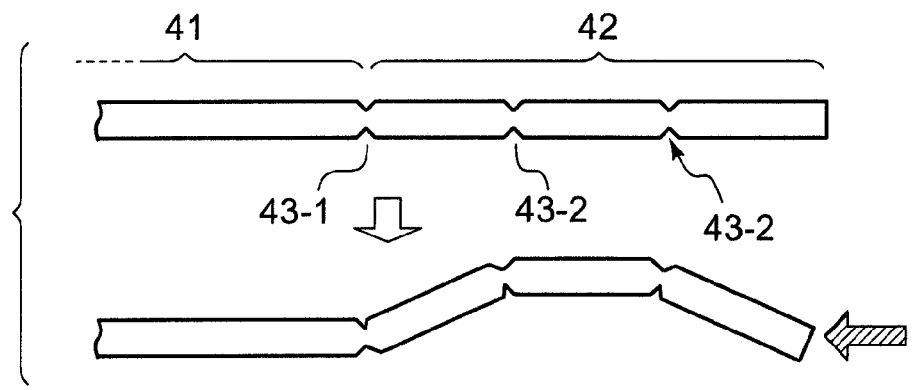
FIG. 7A is a cross sectional view showing another structure of the connection auxiliary member according to the first exemplary embodiment of this invention.

Although FIGS. 6A and 6C show cases where the deformed portion 42 is folded into two, the deformed portion 42 according to this invention may be put into a state where at least one portion thereof rises from the rear chassis 38 in response to pressing or pushing in the predetermined direction. For instance, as shown in FIG. 7A, the deformed portion 42 may be deformed in a trapezoid fashion by forming three concave portions 43-1, 43-2, and 43-2 in the deformed portion 42.

Figure 7B:
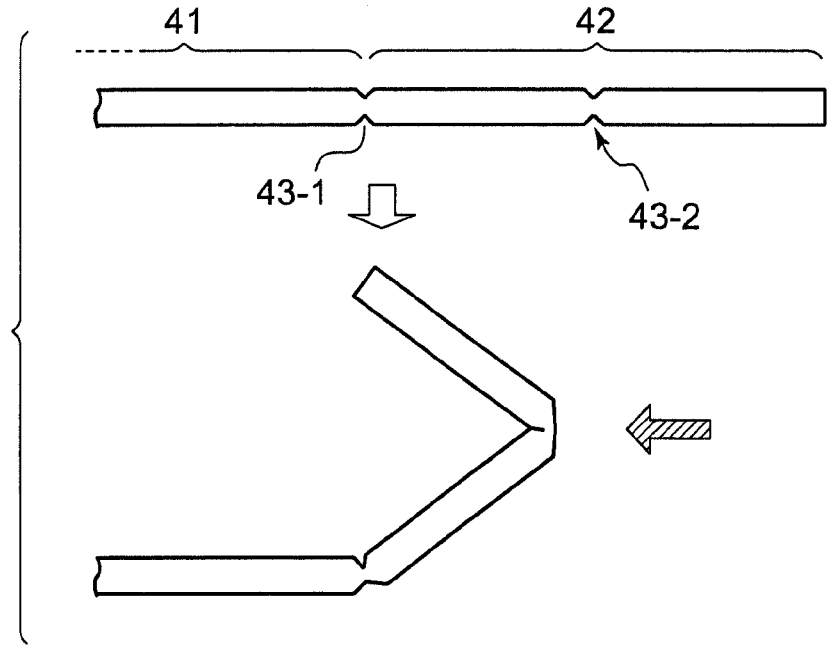
FIG. 7B is a cross sectional view showing another structure of the connection auxiliary member according to the first exemplary embodiment of this invention.

Although the connection auxiliary member 40 has the structure where the deformed portion 42 rises at a position which is substantially divided into equal parts in FIGS. 6A, 6B, and 6C, a rising position may be any position such as a position out of to the fixed portion 41 or a position out of to a tip of the deformed portion 42. For instance, as shown in FIG. 7B, an end part of the deformed portion 42 may rise.

In addition, although the deformed portion 42 is formed to an end part of the fixed portion 41 in consideration of the machinability of the connection auxiliary member 40, a position of the deformed portion 42 may be suitably changed in response to a position of the flexible printed circuit 34.

Figure 8:
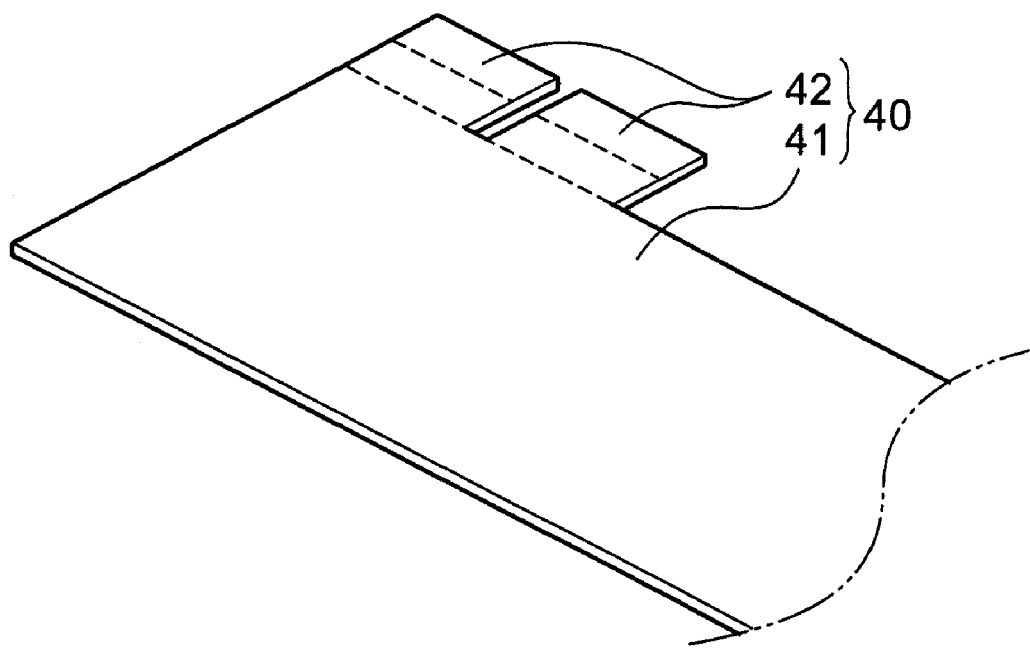
FIG. 8 is a perspective view showing another structure of the connection auxiliary member according to the first exemplary embodiment of this invention.

Although the connection auxiliary member 40 has structure where the deformed portion 42 rises the two flexible printed circuits 34 at the same time, the connection auxiliary member 40 may have structure where two separated deformed portions 42 raise the flexible printed circuits 34, respectively, as shown in FIG. 8.

Figure 9:
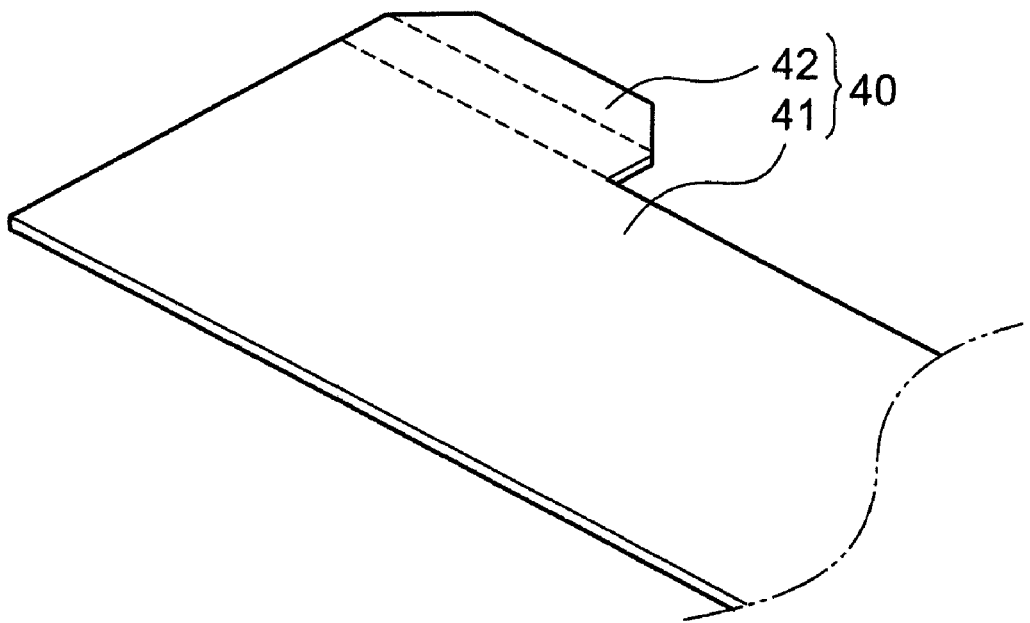
FIG. 9 is a perspective view showing another structure of the connection auxiliary member according to the first exemplary embodiment of this invention.

Although FIGS. 5 through 8 show cases where the deformed portion 42 has a rectangular shape, the deformed portion 42 may have a shape except for the rectangular shape. This is because the deformed portion 42 may be put into a state where at least one part thereof rises from the rear chassis 38 by pressing or pushing in the predetermined direction. For example, the deformed portion 42 may have a trapezoidal shape as shown in FIG. 9.

Although the deformed portion 42 rises at the same height in FIGS. 5 through 9, there are cases where the height rising the terminal portions 34a of the flexible printed circuits 34 should be changed when one of the flexible printed circuits 34 makes easily interference caused by arrangement of parts on the circuit board 22 or the like or when the connectors 23a on the circuit board 22 have different heights.

Figure 10:
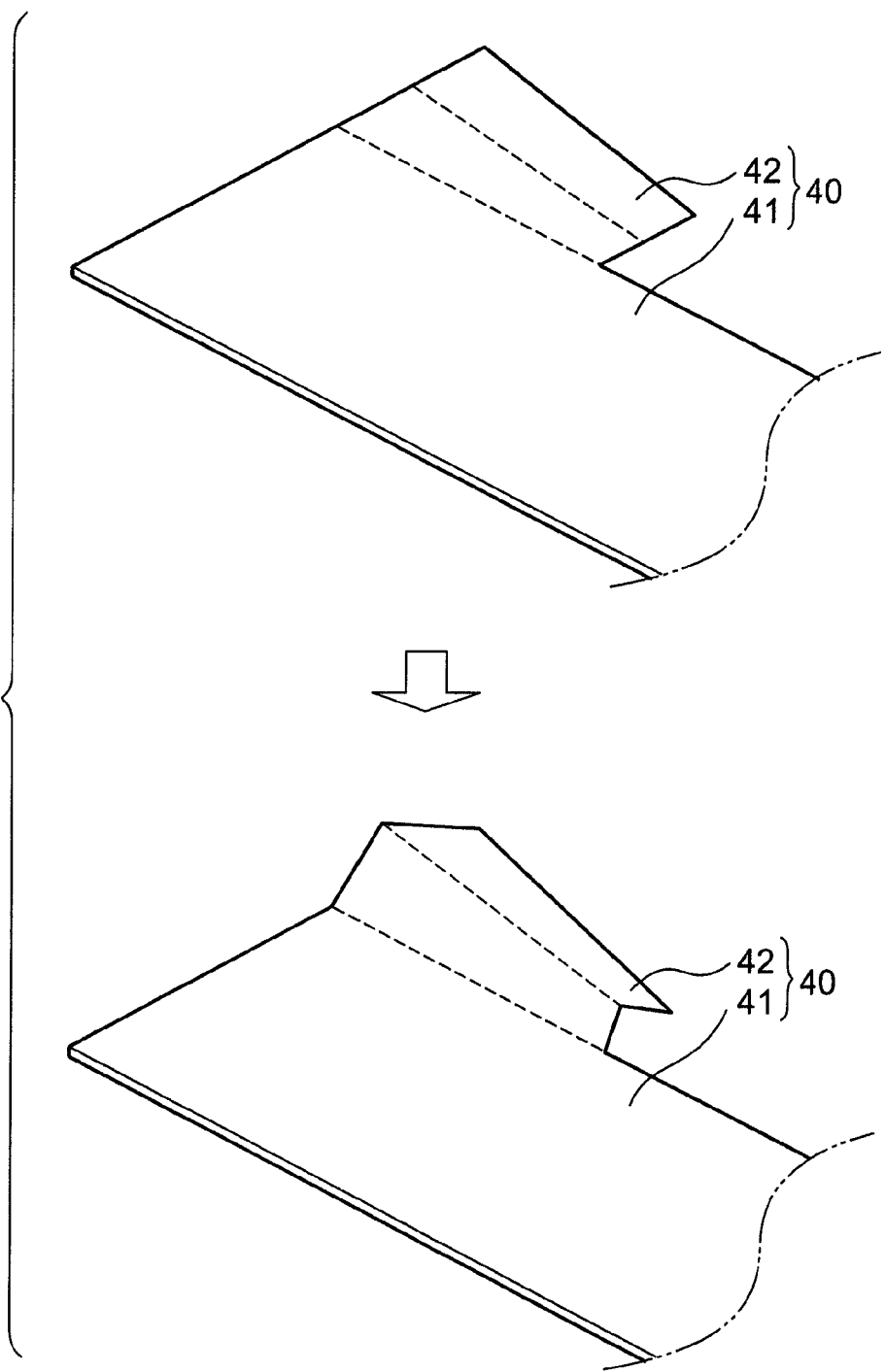
FIG. 10 is a perspective view showing another structure of the connection auxiliary member according to the first exemplary embodiment of this invention.

Under the circumstances, as shown in FIG. 10, the height on bending may change by changing a length of a side in a jutting direction of the deformed portion 42 and by tilting a divided position of the deformed portion 42 with respect to the boundary position. In addition, in structure illustrated in FIG. 8. the height on bending may be change by a length of a side in a jutting direction of each of the deformed portions 42.

Referring now to FIGS. 11 through 15, the description will be made as regards a procedure which connects the flexible printed circuits 34 with the circuit board 22 using the connection auxiliary member 40 having structure shown in FIG. 5.

First, the lamps 32 are attached with the lamp holders 33 and the first ends of the flexible printed circuits 34 are connected to the respective lamps 32. Thereafter, the lamp holders 33 are mounted to the front chassis 31. Subsequently, the reflecting sheet 37, the light-guide plate 36, and the optical members 35 are disposed on the rear chassis 38 in order and the front chassis 31 and the rear chassis 38 are coupled with each other by means of fitting means (not shown) (see FIG. 2)

Figure 11:
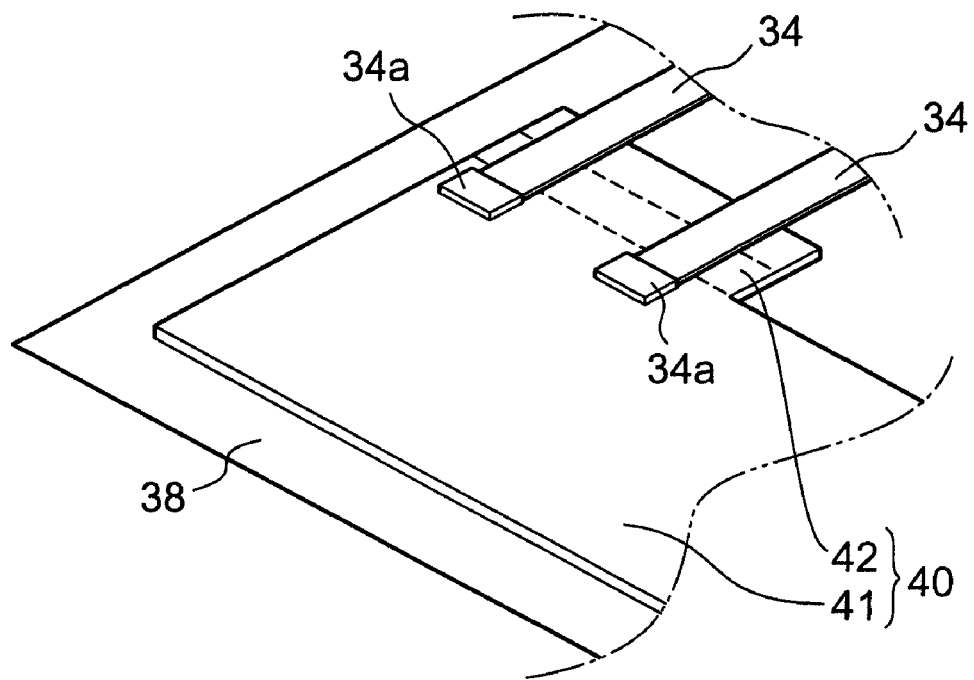
FIG. 11 is a perspective view showing a first step of a connection method using the connection auxiliary member according to the first exemplary embodiment of this invention.

Subsequently, as shown in FIG. 11, the connection auxiliary member 40 is disposed at a position where the circuit board 22 on an upper surface of the rear chassis 38 is disposed and the fixed portion 41 of the connection auxiliary member 40 is fixed to the rear chassis 38 by means of the double-sided adhesive tape 39 or the like. Subsequently, the flexible printed circuits 34 are crawled and parts except for proximity of the terminal portions 34a of the flexible printed circuits 34 are fixed on the rear chassis 38 by means of the FPC fixing portions 38b illustrated in FIG. 4. In this state, the terminal portions 34a of the flexible printed circuits 34 are disposed so as to overlap with the fixed portion 41 by passing through on the deformed portion 42 of the connection auxiliary member 40 and it results in finishing the backlight unit 30.

Figure 12:
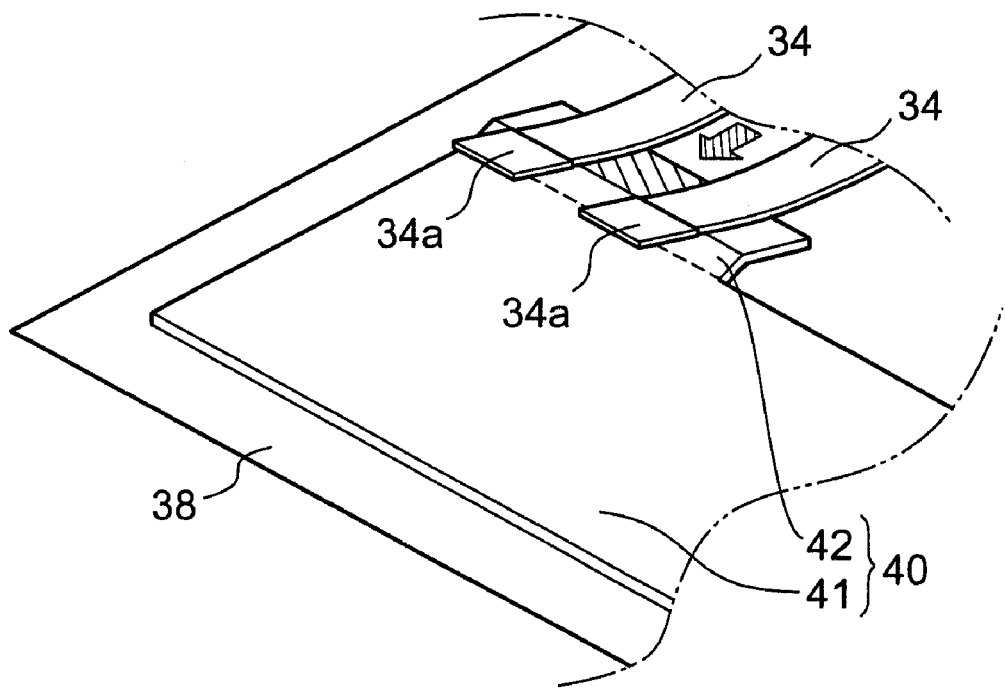
FIG. 12 is a perspective view showing a second step of the connection method using the connection auxiliary member according to the first exemplary embodiment of this invention.

Subsequently, the liquid crystal panel 20 and the backlight unit 30 are disposed to the first cabinet 11 in order, the flexible printed circuit board 21 of the liquid crystal panel 20 is bent, and the circuit board 22 is disposed on the rear chassis 38 of the backlight unit 30. Before this, as shown in FIG. 12, the end portion of the deformed portion 42 of the connection auxiliary member 40 is pressed or pushed toward the fixed portion 41 to raise a substantially center of the deformed portion 42 and it results in lifting up the flexible printed circuits 34 at a raised portion (a ridge line portion) to form a gap between the terminal portions 34a of the flexible printed circuits 34 and the rear chassis 38.

Figure 13:
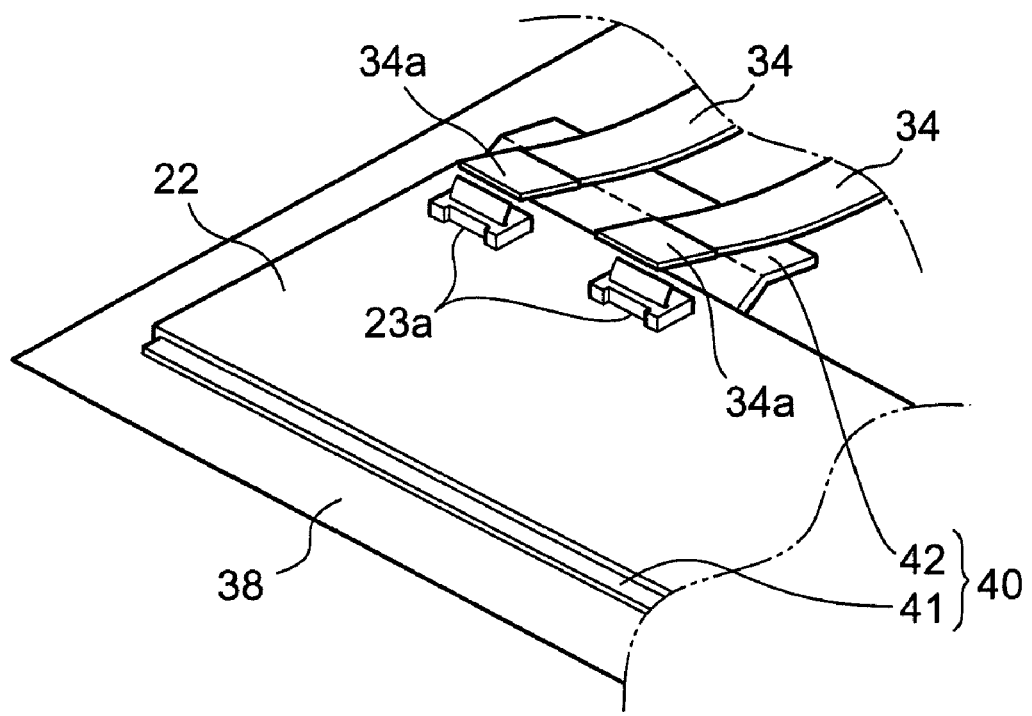
FIG. 13 is a perspective view showing a third step of the connection method using the connection auxiliary member according to the first exemplary embodiment of this invention.

Thereafter, as shown in FIG. 13, the circuit board 22 is disposed on the surface of the rear chassis 38 with the flexible printed circuits 34 lifted up. In this event, inasmuch as there is the gap between the terminal portions 34a of the flexible printed circuits 34 and the rear chassis 38, it is possible to prevent the terminal portions 34a of the flexible printed circuits 34 from sandwiching them between the rear chassis 38 and the circuit board 22. It is therefore possible to improve the workability and to stop the flexible printed circuits 34 getting damaged.

Figure 14:
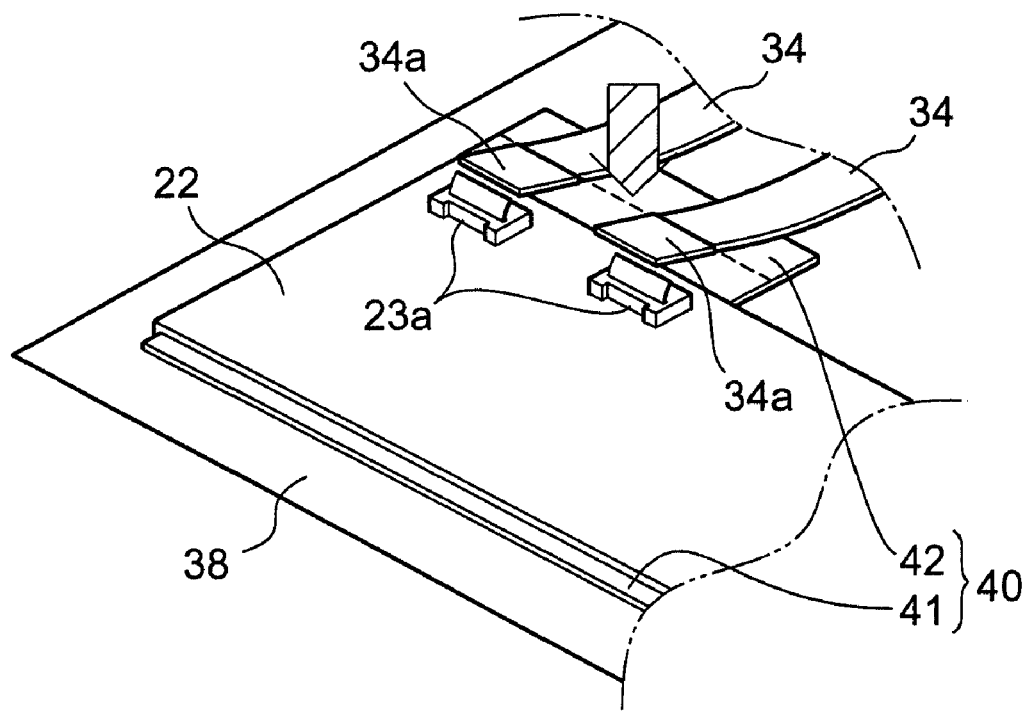
FIG. 14 is a perspective view showing a fourth step of the connection method using the connection auxiliary member according to the first exemplary embodiment of this invention.

Subsequently, as shown in FIG. 14, the raised portion of the deformed portion 42 of the connection auxiliary member 40 is pressed or pushed from above as shown in a diagonally shaded arrow of FIG. 14 to restore the deformed portion 42 to its original shape and it results in bringing the terminal portions 34a of the flexible printed circuits 34 near the connectors 23a.

Figure 15:
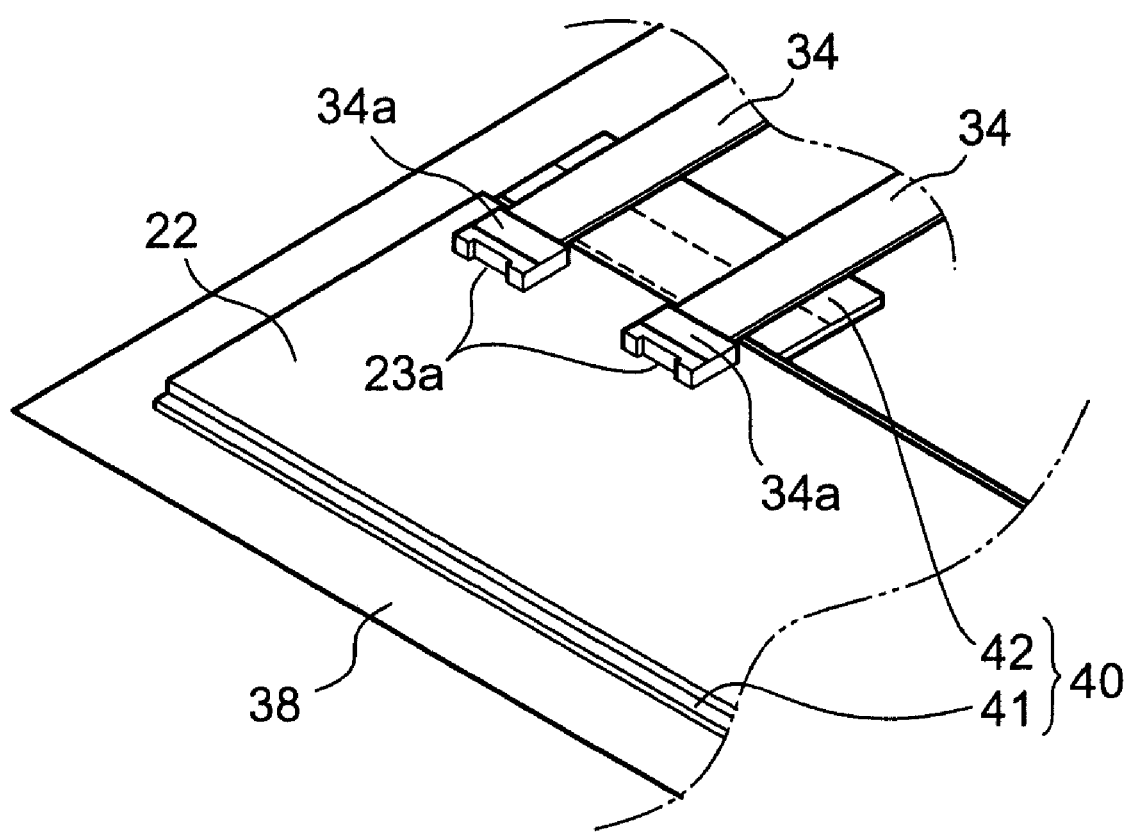
FIG. 15 is a perspective view showing a fifth step of the connection method using the connection auxiliary member according to the first exemplary embodiment of this invention.

Thereafter, as shown in FIG. 15, the terminal portions 34a of the flexible printed circuits 34 are inserted to the connectors 23a to connect the backlight unit 30 with the liquid crystal panel 20. Thereafter, as shown in FIG. 1, the second and the third cabinets 12 and 13 are disposed at a rear side of the backlight unit 30 in order and it is fixed to the first cabinet 11 by means of screws (not shown) or the like and results in finishing the liquid crystal display device 10.

In addition, inasmuch as it is provided that the backlight unit 30 is used singly in the above description, the backlight unit 30 is assembled with the liquid crystal panel 20 with the connection auxiliary member 40 and the flexible printed circuits 34 fixed to the rear chassis 38. Assembling of the backlight unit 30 and assembling of the liquid crystal display device 10 may be carried out at the same place. In this event, the circuit board 22 may be disposed on the rear chassis 38 after the liquid crystal panel 20 and the backlight unit 30 are disposed to the first cabinet 11 in order and the connection auxiliary member 40 and the flexible printed circuits 34 are fixed to the rear chassis 38. Furthermore, although the terminal portions 34a of the flexible printed circuit 34 are inserted in the connectors 23a of the circuit board 22 in the above description, the terminal portions of the circuit board 22 and the terminal portions 34a of the flexible printed circuit 34 may be connected to each other by means of press-fitting, soldering, ACF (anisotropic conductive film), or the like.

Now, the description will proceed to other examples of the connection structure according to the first exemplary embodiment.

In FIG. 12, when the deformed portion 42 is pushed to deform it, the flexible printed circuits 34 are lifted by pushing it by the deformed portion 42. Inasmuch as the flexible printed circuits 34 are fixed to the rear chassis 38 at the parts except for proximity to the terminal portions 34a, the deformed portion 42 makes to return to its original shape by a returned force of the flexible printed circuits 34. Therefore, it is necessary to keep on pushing the deformed portion 42 until the circuit board 22 is disposed on the surface of the rear chassis 38. As methods of working around this problem, there are a method of forming the connection auxiliary member 40 into a material and a thickness which do not become deformed at a force of the order the returned force of the flexible printed circuits 34 and a method of bending the deformed portion 42 to a closed angle even further.

Figure 16A:
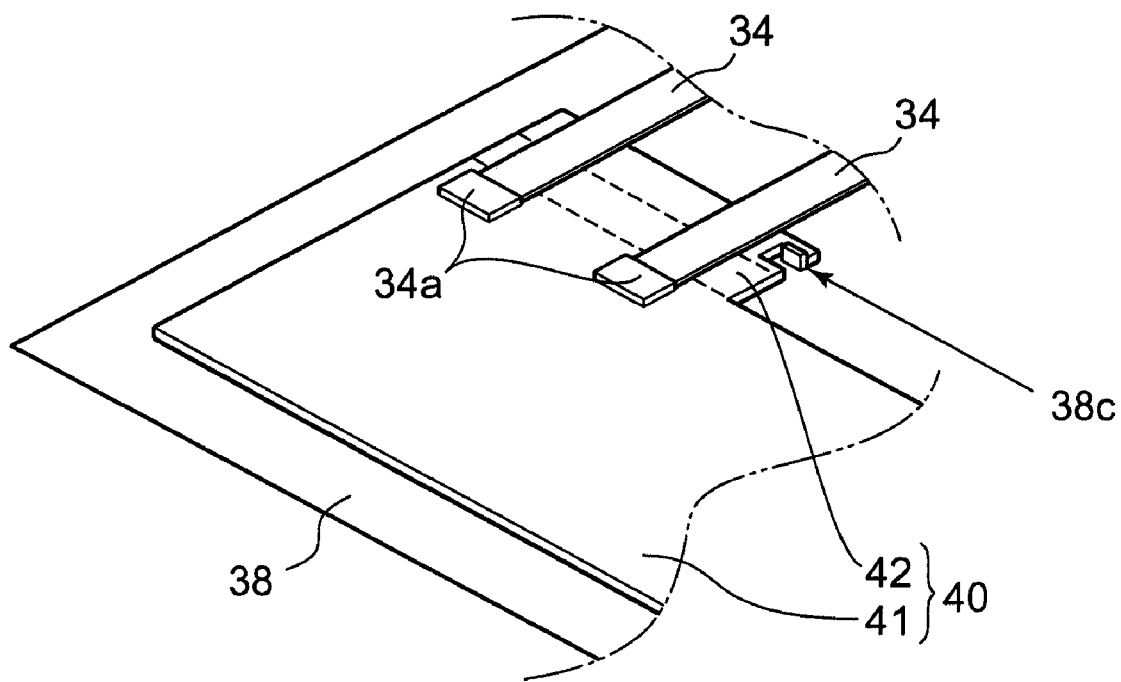
FIG. 16A is a perspective view showing another structure of the connection auxiliary member and a first step of a connection method using the connection auxiliary member according to the first exemplary embodiment of this invention.
Figure 16B:
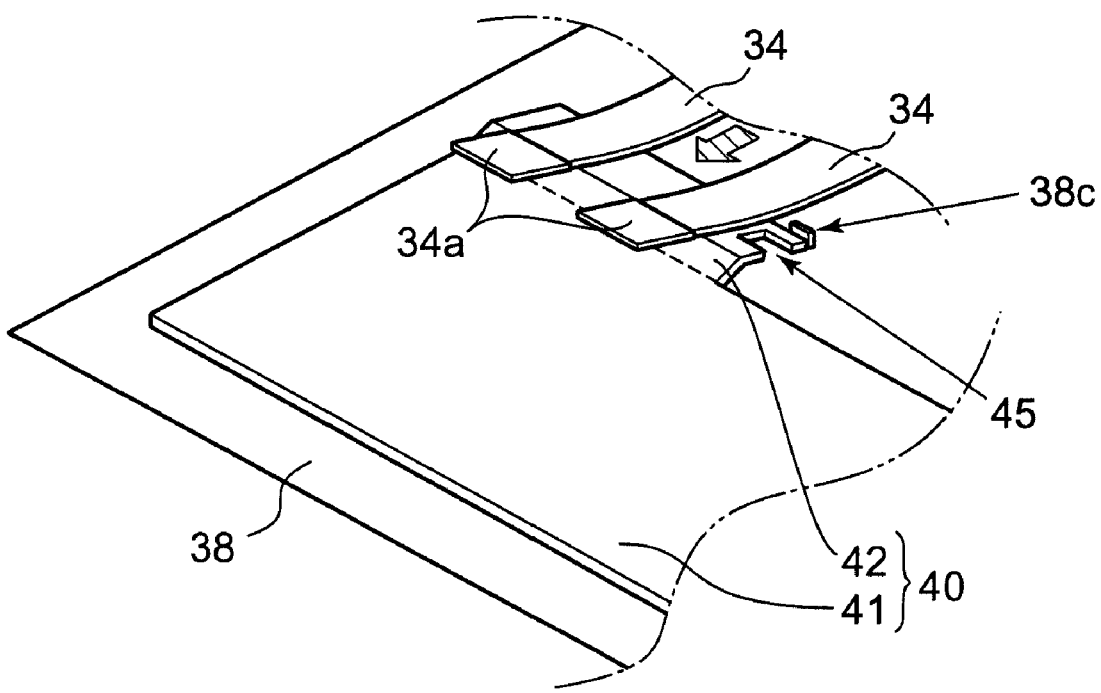
FIG. 16B is a perspective view showing another structure of the connection auxiliary member and a second step of the connection method using the connection auxiliary member according to the first exemplary embodiment of this invention.

In order to further improve the workability, the connection auxiliary member 40 may have a structure, for example, shown in FIGS. 16A and 16B. More specifically, the rear chassis 38 is provided with a protrusion portion 38c and the deformed portion 42 is provided with a protrusion mounting portion 45 having a shape which is enable to mount the protrusion portion 38c. In a state where any force is not applied to the deformed portion 42, the protrusion portion 38c is mounted in the protrusion mounting portion 45 as shown in FIG. 16A. In a state where the deformed portion 42 is deformed by pushing it, an end portion of the deformed portion 42 is engaged to the protrusion portion 38c as shown in FIG. 16B. That is, the terminal portions 34a of the flexible printed circuits 34 are maintained at a lifted-up state from the surface of the rear chassis 38 by engaging the protrusion portion 38c with the end portion of the deformed portion 42. With this structure, inasmuch as the deformed portion 42 is not turned back to its original shape although pushing of the deformed portion 42 is stopped, it is possible to easily carry out a mounting work of the circuit board 22.

In addition, inasmuch as the structure illustrated in FIGS. 16A and 16B is exemplified, shapes, sizes, and structures of the protrusion portion 38c and the protrusion mounting portion 45, and a protrusion amount and a material of the protrusion portion 38c are particularly not limited to this illustrated in FIGS. 16A and 16B. For instance, the protrusion portion 38c may have structure so as to incline to the connection auxiliary member 40 side and the protrusion mounting portion 45 may have a side surface having a shape (an inversed tapered shape) so as to expand downward. With this structure, it is possible to easily carry out a work for bending the deformed portion 42.

In addition, although the protrusion portion 38c is provided on the surface of the rear chassis 38, a tip of the deformed portion 42 may be provided with a protrusion portion and the rear chassis 38 may be provided with a concave portion engaged with the protrusion portion. With this structure, in a state where the deformed portion 42 is deformed by pushing it, the protrusion portion of the deformed portion 42 is engaged with the concave portion of the rear chassis. Alternatively, a side portion of the deformed portion 42 may be provided with a first protrusion portion and the rear chassis 38 may be provided with a second protrusion portion engaged with the first protrusion portion. With this structure, in a state where deformed portion 42 is deformed by pushing it, both of the first and the second protrusion portions are engaged with each other.

In the above-mentioned exemplary embodiment, so as to prevent the flexible printed circuits 34 from being in contact with other members on transferring or handling the backlight unit 30, the FPC fixing portions 38b of the rear chassis 38 fix the parts except for proximity to the terminal portions 34a of the flexible printed circuits 34.

Figure 17A:
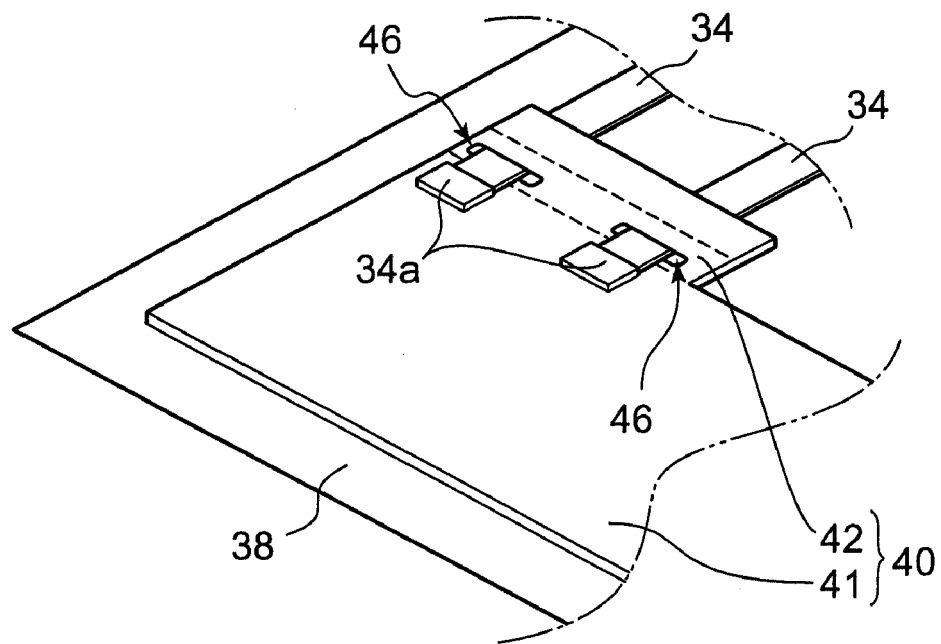
FIG. 17A is a perspective view showing another structure of the connection auxiliary member and a first step of a connection method using the connection auxiliary member according to the first exemplary embodiment of this invention.
Figure 17B:
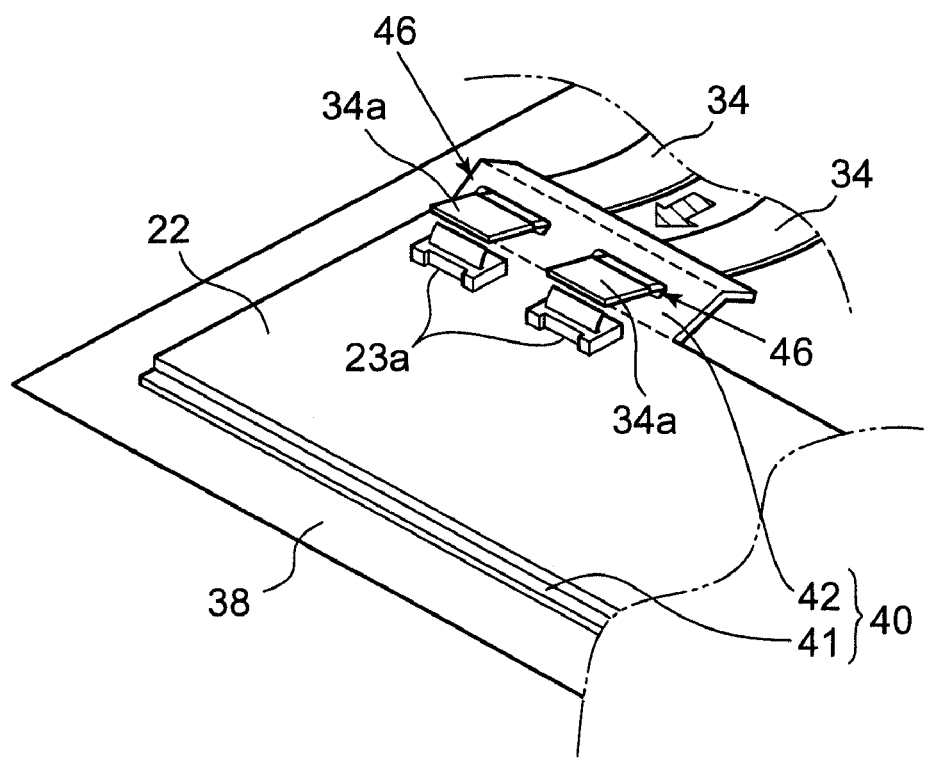
FIG. 17B is a perspective view showing another structure of the connection auxiliary member and a second step of the connection method using the connection auxiliary member according to the first exemplary embodiment of this invention.

In order to prevent the flexible printed circuits 34 from being in contact with other members with more reliability, for example, as shown in FIGS. 17A and 17B, the deformed portion 42 may be provided with through holes 46 through which the terminal portions 34a of the flexible printed circuit 34 are inserted. With this structure, when the deformed portion 42 is pushed toward the fixed portion 41, the central portion of the deformed portion 42 rises to lift up the terminal portions 34a of the flexible printed circuits 34. It therefore results in similar effect.

With this structure, in the manner which is described above, the rear chassis 38 may be provided with the protrusion portion 38c and the deformed portion 42 may be provided with the protrusion mounting portion 45 or the deformed portion 42 may be provided with the protrusion portion and the rear chassis 38 may be provided with the concave portion. With this structure, inasmuch as the terminal portions 34a of the flexible printed circuits 34 are maintained with the lifted-up state, it is possible to improve the workability even further.

Figure 18A:
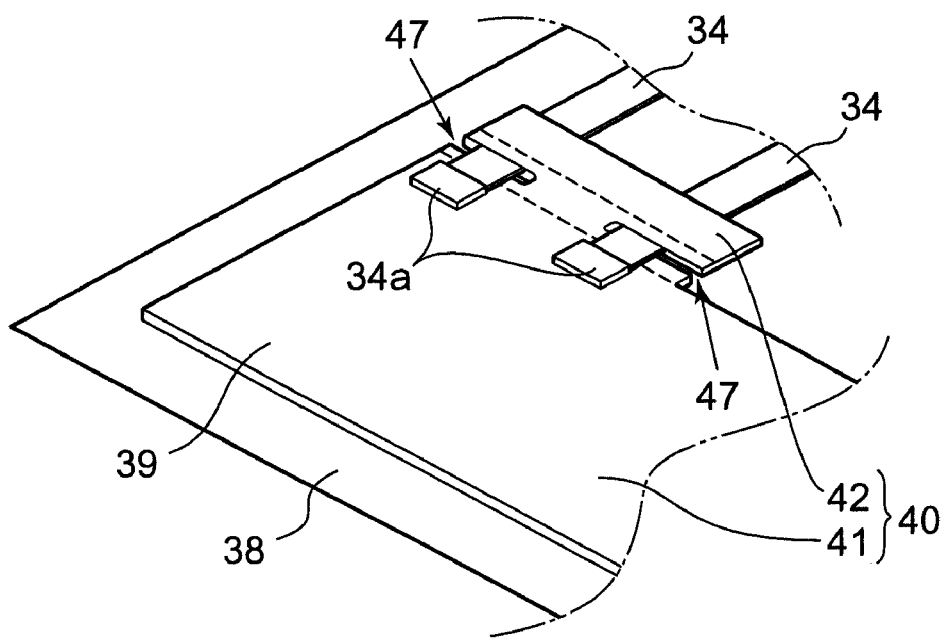
FIG. 18A is a perspective view showing another structure of the connection auxiliary member and a first step of a connection method using the connection auxiliary member according to the first exemplary embodiment of this invention.
Figure 18B:
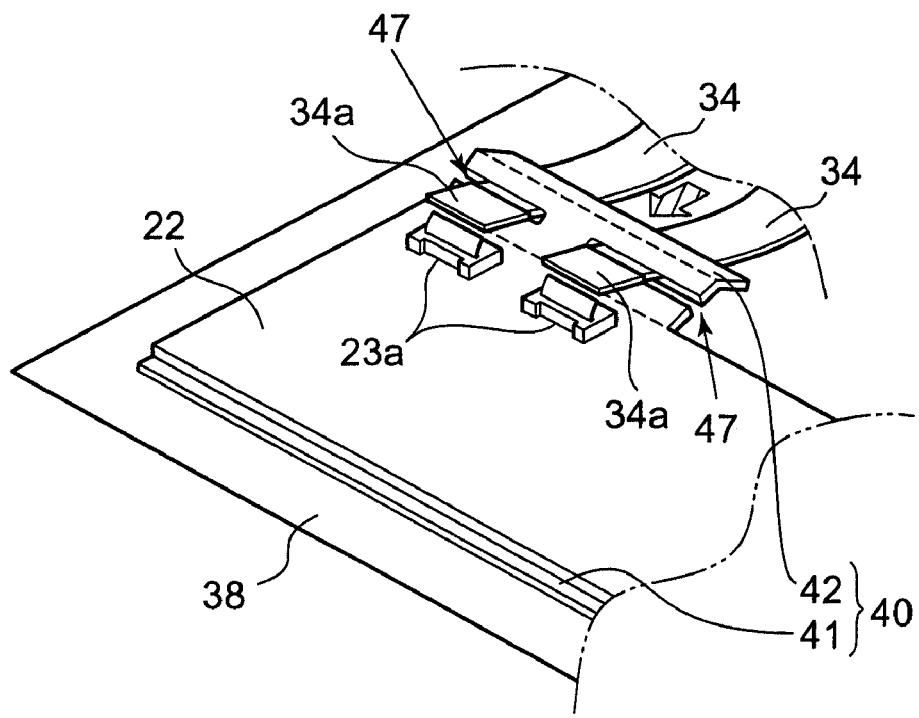
FIG. 18B is a perspective view showing another structure of the connection auxiliary member and a second step of the connection method using the connection auxiliary member according to the first exemplary embodiment of this invention.

In addition, although the deformed portion 42 is provided with the through holes 46 in FIGS. 17A and 17B, the deformed portion 42 may be provided with slits 47 at a side surface portion thereof into which the flexible printed circuits 34 are inserted as shown in FIGS. 18A and 18B. Inasmuch as each of the flexible printed circuits 34 deforms hard in a width direction thereof, the flexible printed circuits 34 are easily not detached from the slits 47.

In addition, a case of causing the connection auxiliary member 40 have an insulating function to the circuit board 22 and the rear chassis 38, it is necessary to dispose the connection auxiliary member 40 to a lower portion of the circuit board 22.

Figure 19A:
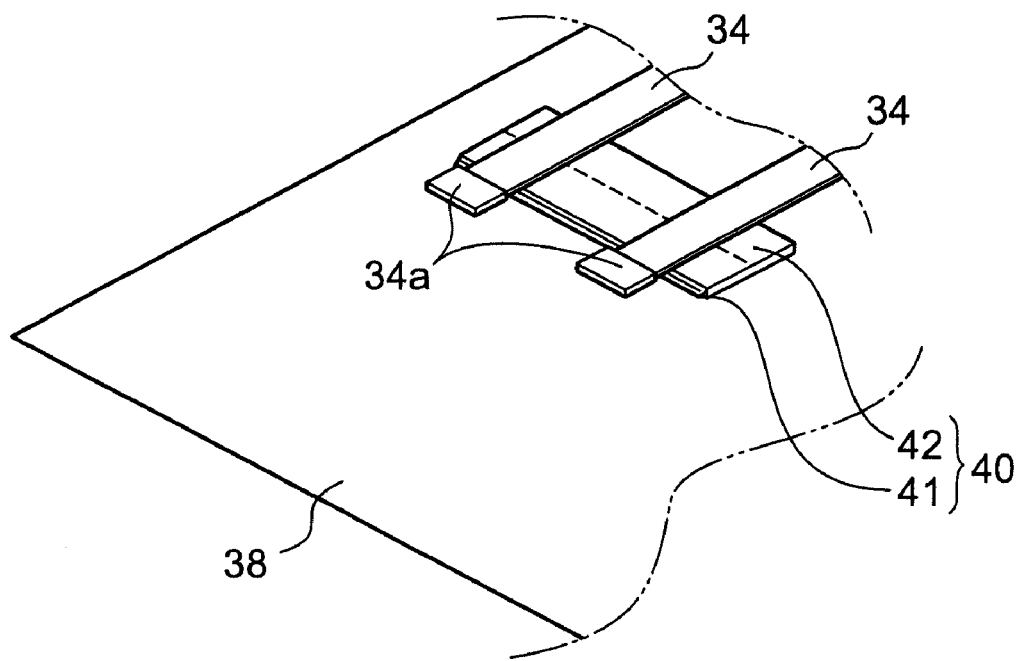
FIG. 19A is a perspective view showing another structure of the connection auxiliary member and a first step of a connection method using the connection auxiliary member according to the first exemplary embodiment of this invention.
Figure 19B:
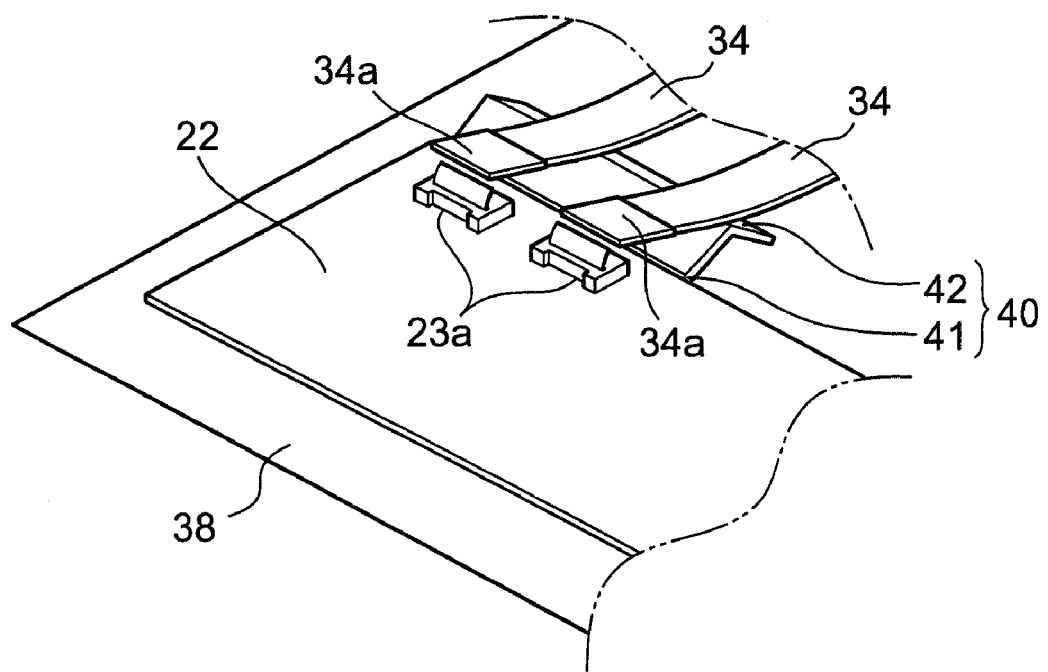
FIG. 19B is a perspective view showing another structure of the connection auxiliary member and a second step of the connection method using the connection auxiliary member according to the first exemplary embodiment of this invention.

However, there are cases which may not take into account isolation to the circuit board 22 and the rear chassis 38 when the rear chassis 39 is made of an insulating material such as plastic or hard rubber or when the circuit board 22 has a rear surface where terminals or wires are not exposed. Under the circumstances, for example, the connection auxiliary member 40 may have a shape so as to cover only a proximity area of the terminal portions 34a of the flexible printed circuits 34 as shown in FIGS. 19A and 19B.

In a case of this structure, only one end portion of the connection auxiliary member 40 may be fixed to the rear chassis 38 with any fixing method. More specifically, it will be assumed that an end portion of the connection auxiliary member 40 at the terminal portions 34a side of the flexible printed circuits 34 is fixed to the rear chassis 38 as shown in FIGS. 19A and 19B. In this event, the pushing may be carried out from base sides of the flexible printed circuits 34. It will be assumed that another end portion of connection auxiliary member 40 at the base side of the flexible printed circuits 34 is fixed to the rear chassis 38. In this event, the pushing may be carried out from the terminal portions 34a side of the flexible printed circuits 34. In a case of the latter, inasmuch as the terminal portions 34a of the flexible printed circuits 34 automatically lift up by pushing the connection auxiliary member 40 by means of the circuit board 22, it is possible to heighten working efficiency.

In the manner which is described above, at the proximity to at least the terminal portions 34a of the flexible printed circuits 34 on the rear chassis 38 of the backlight unit 30, by disposing the connection auxiliary member 40 whose at least one part is lifted up by pushing from a predetermined direction, it is possible to dispose the circuit board 22 to the rear chassis 38 with the terminal portions 34a of the flexible printed circuits 34 lifted up by deforming the deformed portion 42. As a result, it is possible to improve the workability without sandwiching the flexible printed circuits 34 between the rear chassis 38 and the circuit board 22 and it is possible to prevent the flexible printed circuits 34 from damaging.

In the first exemplary embodiment of this invention, the deformed portion 42 may have a through hole 46 or a slit 47 through which the flexible printed circuit 34 is inserted. The connection auxiliary member 40 may have a first concave portion 43-1 at a boundary between fixed portion 41 and the deformed portion 42 and a second concave portion 43-2 in the deformed portion at an arbitrary position which is substantially orthogonal in a pushing direction. Under the circumstances, the deformed portion 42 is bent at the first concave portion 43-1 as the starting so that the arbitrary position becomes a ridge line when the deformed portion 42 is pushed in the pushing direction. The chassis 38 may has a protrusion portion 38c. In this event, the terminal portion 34a of the flexible printed circuit 34 is maintained at a lifted-up state from the surface of the chassis 38 by engaging the protrusion portion 38c with an end portion of the deformed portion 42. The fixed portion 41 may be made of an insulating material formed so as to cover the mounted area of the circuit board 22. In this event, the chassis 38 and the circuit board 22 are insulated with each other by the fixed portion 41.

Exemplary Embodiment 2

Figure 20A:
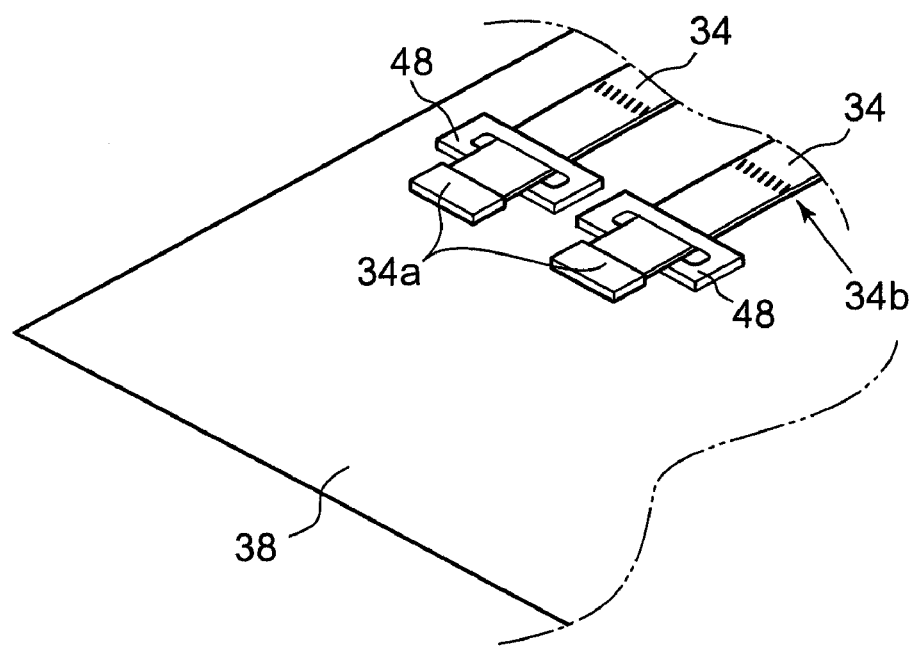
FIG. 20A is a perspective view showing a connection auxiliary member according to a second exemplary embodiment of this invention and a first step of a connection method using the connection auxiliary member.
Figure 20B:
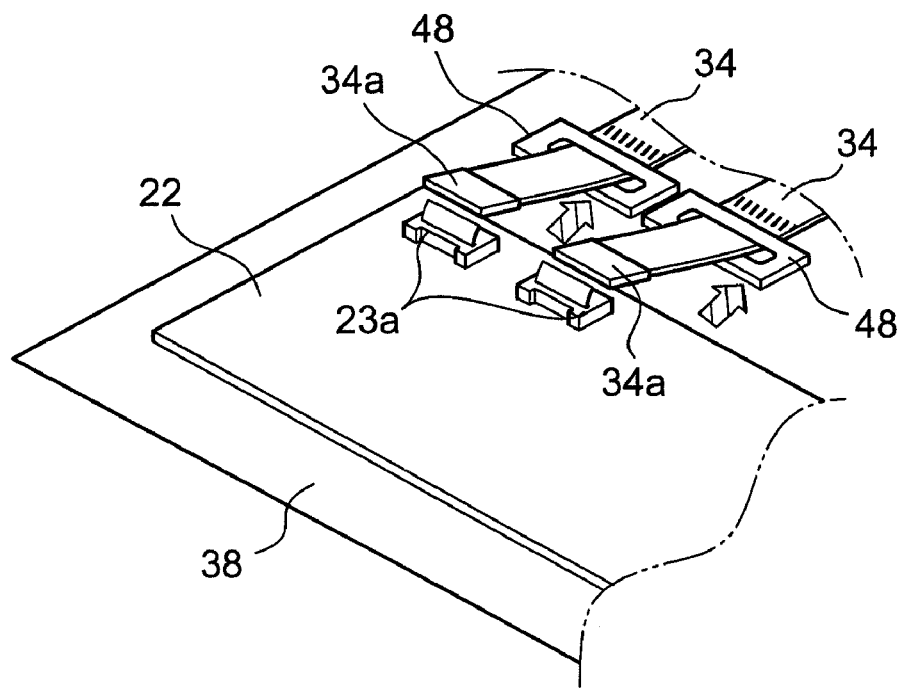
FIG. 20B is a perspective view showing the connection auxiliary member according to the second exemplary embodiment of this invention and a second step of the connection method using the connection auxiliary member.

Referring now to FIGS. 20A and 20B, the description will proceed to a backlight unit and a connection auxiliary member 48 according to a second exemplary embodiment of this invention. FIGS. 20A and 20B are perspective views showing structure and a connection method of the connection auxiliary member 48 according to the second exemplary embodiment of this invention.

Although the connection auxiliary member 40 is fixed on the member (the rear chassis 38) where the flexible printed circuits 34 are fixed in the above-mentioned first exemplary embodiment of this invention, it is possible to obtain an effect similar to that of the first exemplary embodiment even if the connection auxiliary member is inserted to the flexible printed circuits 34.

For example, as shown in FIGS. 20A and 20B, tow frame-shaped connection auxiliary members 48 are prepared. Each of the connection auxiliary members 48 has a through hole which is larger than a cross-sectional shape of the flexible printed circuit 34. The connection auxiliary members 48 are inserted from the terminal portions 34a side of the respective flexible printed circuits 34. In this event, the bases side of the flexible printed circuits 34 are fixed to the rear chassis 48 by means of the FPC fixing portions 38b as shown in FIG. 4 and portions where the connection auxiliary members 48 are inserted are put into a state where they raise from the rear chassis 38 by means of the connection auxiliary members 48. As a result, when the connection auxiliary members 48 are shifted to a base direction (a direction depicted at diagonally shaded arrows of FIG. 20B) of the flexible printed circuits 34, spaces between fulcrums (fixed locations) 34b and points of action (portions where the connection auxiliary members 48 are inserted) become narrow and it results in slowly lifting up the terminal portions 34a of the flexible printed circuits 34. At the time of this, if the size of the through hole of the connection auxiliary member 48 are equal to the cross-sectional shape of the flexible printed circuit 34, the connection auxiliary members 48 hard turn back to its original positions and it results in improving the workability.

The connection auxiliary member 48 may have structure which can be inserted to the flexible printed circuit 34 and which does not easily leave the flexible printed circuit 34 and a shape, a thickness, a material thereof and so on are especially not restricted. For example, the connection auxiliary member 48 may be made of an insulation material such as a plastic material, for instance, PET or a paper material. The connection auxiliary member 48 may be made of a conductive material such as metal. In addition, the connection auxiliary member 48 may have a slit so as to easily insert it to the flexible printed circuit 34.

Although FIGS. 20A and 20B show an example where the connection auxiliary members 48 are inserted to the respective flexible printed circuits 34, one connection auxiliary member 48 may have a plurality of through holes which are equal in number to the flexible printed circuits and which can simultaneously lift up the plurality of flexible printed circuits 34. In addition, the rear chassis 38 may be provided with protrusion portions in the second exemplary embodiment. With this structure, by engaging the connection auxiliary members 48 with the protrusion portions in a state where the connection auxiliary members 48 are brought near to the fixed locations 34b of the flexible printed circuits 34, it is possible to maintain the lifted-up state of the terminal portions 34a of the flexible printed circuits 34 with reliability.

Exemplary Embodiment 3

Figure 21A:
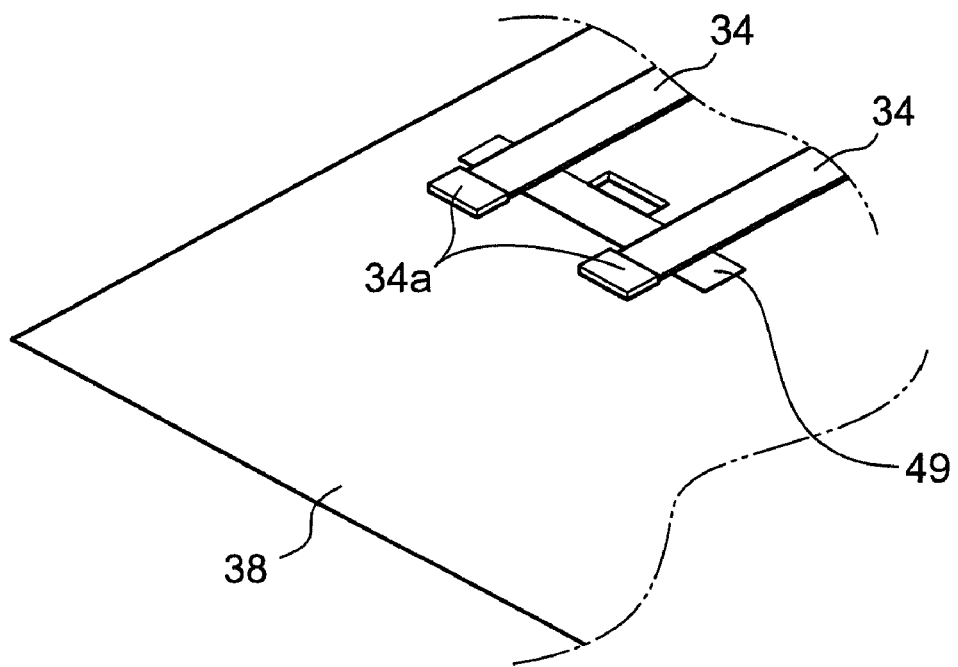
FIG. 21A is a perspective view showing a connection auxiliary member according to a third exemplary embodiment of this invention and a first step of a connection method using the connection auxiliary member.
Figure 21B:
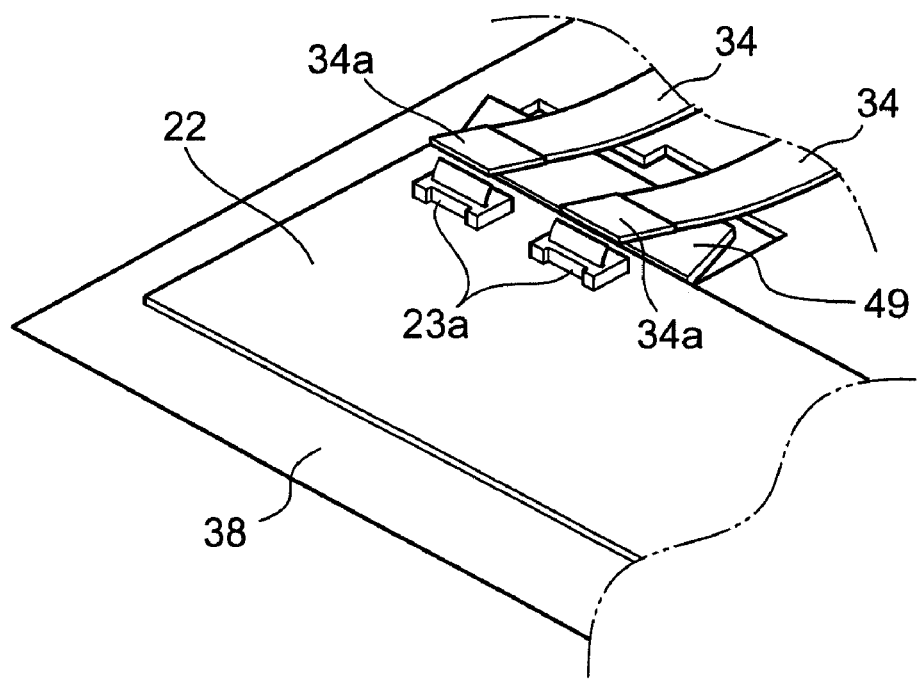
FIG. 21B is a perspective view showing the connection auxiliary member according to the third exemplary embodiment of this invention and a second step of the connection method using the connection auxiliary member.

Referring now to FIGS. 21A and 21B, the description will proceed to a backlight unit according to a third exemplary embodiment of this invention. FIGS. 21A and 21B are perspective views showing structure and a connection method of a connection auxiliary portion 49 according to the third exemplary embodiment of this invention.

Although the connection auxiliary member 40 or 48 is fixed to the surface of the rear chassis 38 or is inserted to the flexible printed circuit 34 in the above-mentioned first and second exemplary embodiments of this invention, it is possible to obtain effect similar to that of the first exemplary embodiment of this invention by causing the rear chassis 38 itself have a connection auxiliary structure.

For example, as shown in FIGS. 21A and 21B, the rear chassis 38 has the connection auxiliary portion 49 which is obtained by separating an area close to the terminal portions 34a of the flexible printed circuits 34 and the connection auxiliary portion 49 is coupled to the rear chassis 38 through a hinge portion (not shown) which is provided to the connection auxiliary portion 49 at a side of an area where the circuit board 22 is mounted. By rotating about the hinge portion to lift up an opposite side, it is possible to lift up the terminal portions 34a of the flexible printed circuits 34. With this structure, inasmuch as it is possible to house the connection auxiliary portion 49 in the rear chassis 38, it is possible to suppress an increase of the thickness of the backlight unit 30.

In the above-mentioned structure, the connection auxiliary portion 49 may be made of a material which is similar to that of the rear chassis 38 or may be made of a material which is different from that of the rear chassis 38. In addition, in the manner which is similar to that in the first exemplary embodiment of this invention, the connection auxiliary portion 49 may have structure where a central portion thereof is bent. Furthermore, the rear chassis 38 may have a step at a side wall of a portion where the connection auxiliary portion 49 is separated. With this structure, it is possible to prevent the connection auxiliary portion 49 from falling. Although one connection auxiliary portion 49 is provided to the plurality of flexible printed circuits 34 in FIGS. 21A and 21B, a plurality of connection auxiliary portions 49 may be provided with the plurality of flexible printed circuits 34, respectively.

An exemplary advantage according to the invention is capable of improving the workability on connecting the flexible printed circuit with the circuit board and of preventing the flexible printed circuit from damaging.

While this invention has been particularly shown and described with reference to exemplary embodiments thereof, the invention is not limited to these embodiments. It will be understood by those of ordinary skilled in the art that various changes in form and details may be made therein without departing from the spirit and scope of the present invention as defined by the claims. For example, this invention may be applied to any devices each having a connection structure for connecting a flexible printed circuit with a circuit board by disposing the circuit board so as to interfere to a terminal portion of the flexible printed circuit, for example, a personal computer, a digital camera, a plasma display panel, and so on.

What is claimed is:

1. A device comprising a chassis and a flexible printed circuit, said flexible printed circuit having a terminal portion which is disposed so as to overlap with a mounted area of a circuit board mounted on a surface of said chassis,
    wherein said device comprising a connection auxiliary member which is disposed on the surface of said chassis at a position close to said terminal portion, said connection auxiliary member comprising a fixed portion fixed to the surface of said chassis and a deformed portion connected to said fixed portion,
    wherein said deformed portion deforms so that a part of said deformed portion rises from the surface of said chassis by pushing said deformed portion toward said fixed portion to lift up said terminal portion of said flexible printed circuit from the surface of said chassis.

2. The device as claimed in claim 1, wherein said deformed portion has a through hole or a slit through which said flexible printed circuit is inserted.

3. The device as claimed in claim 1, wherein said connection auxiliary member has a first concave portion at a boundary between said fixed portion and said deformed portion and a second concave portion in said deformed portion at an arbitrary position which is substantially orthogonal in a pushing direction,
    wherein said deformed portion is bent at said first concave portion as the starting so that said arbitrary position becomes a ridge line when said deformed portion is pushed in the pushing direction.

4. The device as claimed in claim 3, wherein said chassis has a protrusion portion, whereby said terminal portion of said flexible printed circuit is maintained at a lifted-up state from the surface of said chassis by engaging said protrusion portion with an end portion of said deformed portion.

5. The device as claimed in claim 1, wherein the fixed portion is made of an insulating material formed so as to cover the mounted area of said circuit board, whereby said chassis and said circuit board are insulated with each other by said fixed portion.

6. A device comprising a chassis and a flexible printed circuit, said flexible printed circuit having a terminal portion which is disposed so as to overlap with a mounted area of a circuit board mounted on a surface of said chassis, said flexible printed circuit being fixed to a surface of said chassis at a fixed location except for proximity to said terminal portion,
    wherein said device comprises a frame-shaped connection auxiliary member mounted to said flexible printed circuit, said connection auxiliary member having a through hole which is enable to insert said flexible printed circuit,
    wherein said connection auxiliary member lifts up said terminal portion of said flexible printed circuit from the surface of said chassis so as to act said fixed location as a fulcrum and to act said connection auxiliary member as a point of action by shifting said connection auxiliary member from said terminal portion side toward said fixed location side.

7. A device comprising a chassis and a flexible printed circuit, said flexible printed circuit having a terminal portion which is disposed so as to overlap with a mounted area of a circuit board mounted on a surface of said chassis,
    wherein said chassis comprises a connection auxiliary portion at an area in the vicinity of said terminal portion, said connection auxiliary portion being separated from said chassis, said connection auxiliary portion being coupled to said chassis by means of a hinge portion disposed to one end portion thereof,
    wherein said connection auxiliary portion lifts up said terminal portion of said flexible printed circuit from the surface of said chassis by rotating about said hinge portion to lift up an opposite side thereof.

8. A connection auxiliary member for use in connecting a terminal portion of a flexible printed circuit with a circuit board mounted on a surface of a chassis,
    wherein said connection auxiliary member comprises a fixed portion fixed to the surface of said chassis and a deformed portion connected to said fixed portion,
    wherein said connection auxiliary member having a function for lifting up said terminal portion of said flexible printed circuit from the surface of said chassis by deforming so as to rise a part thereof from the surface of said chassis when said deformed portion is pushed toward said fixed portion.

9. The connection auxiliary member as claimed in claim 8, wherein the deformed portion has a through hole or a slit through which said flexible printed circuit is inserted.

10. A chassis on which a circuit board is mounted, said circuit board being connected to a terminal portion of a flexible printed circuit,
    wherein said chassis has a connection auxiliary portion at an area in the vicinity of said terminal portion, said connection auxiliary portion being separated from said chassis, said connection auxiliary portion being coupled to said chassis by a hinge portion disposed to one end portion thereof, wherein said connection auxiliary portion has a function for lifting up said terminal portion of said flexible printed circuit from the surface of said chassis by rotating about said hinge portion to lift up an opposite side thereof.

* * * * *